(12) United States Patent
Shahana et al.

(10) Patent No.: US 12,371,125 B2
(45) Date of Patent: Jul. 29, 2025

(54) HUMAN-POWERED VEHICLE CONTROL DEVICE

(71) Applicant: Shimano Inc., Osaka (JP)

(72) Inventors: Satoshi Shahana, Osaka (JP); Mitsuhiko Kawasaki, Osaka (JP); Toru Takayanagi, Osaka (JP); Hayato Shimazu, Osaka (JP); Hironori Yamazaki, Osaka (JP)

(73) Assignee: Shimano Inc., Osaka (JP)

( * ) Notice: Subject to any disclaimer, the term of this patent is extended or adjusted under 35 U.S.C. 154(b) by 822 days.

(21) Appl. No.: 17/524,959

(22) Filed: Nov. 12, 2021

(65) Prior Publication Data

US 2022/0204126 A1 Jun. 30, 2022

(30) Foreign Application Priority Data

Dec. 28, 2020 (JP) .................................. 2020-219515
Jun. 9, 2021 (JP) .................................. 2021-096952

(51) Int. Cl.
*B62M 6/45* (2010.01)
*B62J 50/22* (2020.01)
*B62M 25/08* (2006.01)

(52) U.S. Cl.
CPC ............... *B62M 6/45* (2013.01); *B62J 50/22* (2020.02); *B62M 25/08* (2013.01)

(58) Field of Classification Search
CPC .......... B62M 6/45; B62M 25/08; B62J 50/22
See application file for complete search history.

(56) References Cited

U.S. PATENT DOCUMENTS

| 5,686,876 A | 11/1997 | Yamamoto et al. |
| 2013/0054068 A1* | 2/2013 | Shoge .................. B62M 9/122 701/22 |
| 2015/0337951 A1* | 11/2015 | Tetsuka .................. F16H 59/44 701/55 |
| 2017/0106866 A1 | 4/2017 | Schieffelin |
| 2019/0118900 A1* | 4/2019 | Nishino .................. B62K 23/02 |
| 2019/0193810 A1* | 6/2019 | Tsuchizawa ............. B62M 6/45 |

FOREIGN PATENT DOCUMENTS

| CN | 107415770 A | * 12/2017 |
| JP | 2019-189191 A | 10/2019 |
| JP | 2020-062925 A | 4/2020 |
| JP | 2020-069985 A | 5/2020 |

* cited by examiner

*Primary Examiner* — Tinh Dang
(74) *Attorney, Agent, or Firm* — Global IP Counselors, LLP

(57) ABSTRACT

A human-powered vehicle control device includes an electronic controller configured to control a motor to drive a transmission body with the motor and operate the transmission body with a derailleur to perform a shifting action that changes the transmission ratio in a case where a crank axle is stopped. The electronic controller includes a first control state in which the shifting action is performed and a second control state in which a driving force of the motor during the shifting action is reduced compared to the first control state. The electronic controller shifts the control state to the second control state in a case where a rider is riding the human-powered vehicle and the human-powered vehicle is stopped. The electronic controller shifts the control state from the second control state to the first control state in a case where a predetermined condition is satisfied.

13 Claims, 16 Drawing Sheets

HUMAN-POWERED VEHICLE CONTROL DEVICE

CROSS-REFERENCE TO RELATED APPLICATIONS

This application claims priority to Japanese Patent Application No. 2020-219515, filed on Dec. 28, 2020, and Japanese Patent Application No. 2021-096952, filed on Jun. 9, 2021. The entire disclosures of Japanese Patent Application Nos. 2020-219515 and 2021-096952 are hereby incorporated herein by reference.

BACKGROUND

Technical Field

The present disclosure generally relates to a human-powered vehicle control device for a human-powered vehicle.

Background Information

Japanese Patent No. 5,686,876 (Patent Document 1) discloses an example of a human-powered vehicle control device configured to drive a chain with a motor so that a derailleur can perform a shifting action even in a case where driving of the chain is stopped.

SUMMARY

One objective of the present disclosure is to provide a human-powered vehicle control device that appropriately performs a shifting action of a derailleur.

A human-powered vehicle control device in accordance with a first aspect of the present disclosure is for a human-powered vehicle. The human-powered vehicle includes a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, and a motor configured to drive the transmission body. The human-powered vehicle control device comprises an electronic controller configured to control the motor. The electronic controller is configured to drive the transmission body with the motor and operate the transmission body with the derailleur to perform a shifting action that changes the transmission ratio in a case where the crank axle is stopped. The electronic controller is configured to be actuated in a control state including a first control state in which the shifting action is performed and a second control state in which a driving force of the motor during the shifting action is reduced compared to the first control state. The electronic controller is configured to shift the control state to the second control state in a case where a rider is riding the human-powered vehicle and the human-powered vehicle is stopped. The electronic controller is configured to shift the control state from the second control state to the first control state in a case where a predetermined condition is satisfied. The human-powered vehicle control device according to the first aspect reduces the driving force of the motor in a case where the rider is riding the human-powered vehicle and the human-powered vehicle is stopped. In a case where the predetermined condition is satisfied, the shifting action of the derailleur is not likely to be restricted. Thus, the shifting action of the derailleur is appropriately performed in accordance with the predetermined condition.

In accordance with a second aspect of the present disclosure, the human-powered vehicle control device according to the first aspect is configured so that the predetermined condition is satisfied in a case where a parameter related to the human driving force is greater than or equal to a first value. With the human-powered vehicle control device according to the second aspect, in a case where the parameter related to the human driving force is greater than or equal to the first value, the shifting action of the derailleur is not likely to be restricted.

A human-powered vehicle control device in accordance with a third aspect of the present disclosure is for a human-powered vehicle. The human-powered vehicle includes a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, and a motor configured to drive the transmission body. The human-powered vehicle control device comprises an electronic controller configured to control the motor. The electronic controller is configured to drive the transmission body with the motor and operate the transmission body with the derailleur to perform a shifting action that changes the transmission ratio in a case where the crank axle is stopped. The electronic controller is configured to be actuated in a control state including a first control state in which the shifting action is performed and a second control state in which a driving force of the motor during the shifting action is reduced compared to the first control state. The electronic controller is configured to shift the control state to the second control state in a case where a rider is riding the human-powered vehicle and at least one of a posture of a body of the human-powered vehicle and a posture of the rider is in a predetermined state. The human-powered vehicle control device according to the third aspect shifts the control state to the second control state in a case where the rider is riding the human-powered vehicle and at least one of the posture of the body of the human-powered vehicle and the posture of the rider is in the predetermined state. Thus, the shifting action of the derailleur is appropriately performed.

In accordance with a fourth aspect of the present disclosure, the human-powered vehicle control device according to the third aspect is configured so that the predetermined state includes at least one of: a state in which a changing rate of a posture angle of the body of the human-powered vehicle or a posture angle of the rider is greater than a first changing rate; and a state in which a repetitive increasing and decreasing frequency of the posture angle of the body of the human-powered vehicle or the posture angle of the rider is greater than a first frequency. The human-powered vehicle control device according to the fourth aspect shifts the control state to the second control state in the predetermined state that includes at least one of a state in which the changing rate of the posture angle of the body of the human-powered vehicle or the posture angle of the rider is greater than the first changing rate and a state in which the repetitive increasing and decreasing frequency of the posture angle of the body of the human-powered vehicle or the posture angle of the rider is greater than the first frequency. Thus, the shifting action of the derailleur is appropriately performed.

In accordance with a fifth aspect of the present disclosure, the human-powered vehicle control device according to the fourth aspect is configured so that the posture angle of the body of the human-powered vehicle includes at least one of a roll angle, a yaw angle, and a pitch angle. The human-powered vehicle control device according to the fifth aspect appropriately shifts the control state in accordance with the posture angle of the body of the human-powered vehicle that includes at least one of the roll angle, the yaw angle, and the pitch angle.

In accordance with a sixth aspect of the present disclosure, the human-powered vehicle control device according to the third aspect is configured so that the electronic controller is configured to determine the posture of the rider in accordance with the human driving force and an angle of the crank axle. The human-powered vehicle control device according to the sixth aspect determines the posture of the rider in accordance with the angle of the crank axle.

In accordance with a seventh aspect of the present disclosure, the human-powered vehicle control device according to any one of the third to sixth aspects is configured so that the predetermined state includes a contact state of the wheel with ground. The human-powered vehicle control device according to the seventh aspect appropriately shifts the control state in accordance with the contact state of the wheel with ground.

In accordance with an eighth aspect of the present disclosure, the human-powered vehicle control device according to any one of the third to seventh aspects is configured so that the predetermined state includes a standing pedaling state of the rider. The human-powered vehicle control device according to the eighth aspect appropriately shifts the control state in accordance with the standing pedaling state of the rider.

In accordance with a ninth aspect of the present disclosure, the human-powered vehicle control device according to any one of the third to eighth aspects is configured so that the predetermined state includes an actuation state of a brake device of the human-powered vehicle. The human-powered vehicle control device according to the ninth aspect appropriately shifts the control state in accordance with the actuation state of the brake device of the human-powered vehicle.

In accordance with a tenth aspect of the present disclosure, the human-powered vehicle control device according to any one of the third to ninth aspects is configured so that the predetermined state includes an actuation state of a suspension device of the human-powered vehicle. The human-powered vehicle control device according to the tenth aspect appropriately shifts the control state in accordance with the actuation state of the suspension device.

In accordance with an eleventh aspect of the present disclosure, the human-powered vehicle control device according to any one of the third to tenth aspects is configured so that the electronic controller is configured to shift the control state to the second control state in a case where the rider is riding the human-powered vehicle and at least one of the posture of the body of the human-powered vehicle and the posture of the rider is in the predetermined state. After shifting the control state to the second control state, the electronic controller is configured to shift the control state to the first control state in a case where a state in which load on the rider is greater than a first load continues over a first period or longer. The human-powered vehicle control device according to the eleventh aspect shifts the control state to the second control state in a case where the rider is riding the human-powered vehicle and at least one of the posture of the body of the human-powered vehicle and the posture of the rider is in the predetermined state. After shifting the control state to the second control state, in a case where a state in which load on the rider is greater than the first load continues over the first period or longer, the shifting action of the derailleur is not likely to be restricted.

In accordance with a twelfth aspect of the present disclosure, the human-powered vehicle control device according to any one of the third to tenth aspects is configured so that the predetermined state includes a case where a steering angle of a handlebar of the human-powered vehicle is outside a predetermined angular range. The predetermined angular range includes an angle corresponding to a direction in which a frame of the human-powered vehicle extends. The human-powered vehicle control device according to the twelfth aspect appropriately shifts the control state in accordance with the steering angle of the handlebar.

In accordance with a thirteenth aspect of the present disclosure, the human-powered vehicle control device according to any one of the third to eleventh aspects is configured so that the electronic controller is configured to determine that the rider is riding the human-powered vehicle in a case where a parameter related to the human driving force is greater than or equal to a first value. The human-powered vehicle control device according to the thirteenth aspect determines that the rider is riding the human-powered vehicle in a case where the parameter related to the human driving force is greater than or equal to the first value.

A human-powered vehicle control device in accordance with a fourteenth aspect is for a human-powered vehicle. The human-powered vehicle includes a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, and a motor configured to drive the transmission body. The human-powered vehicle control device comprises an electronic controller configured to control the motor. The electronic controller is configured to drive the transmission body with the motor and operate the transmission body with the derailleur to perform a shifting action that changes the transmission ratio in a case where the crank axle is stopped. The electronic controller is configured to be actuated in a control state including a first control state in which the shifting action is performed and a second control state in which a driving force of the motor during the shifting action is reduced compared to the first control state. The electronic controller is configured to shift the control state to the first control state in a case where a parameter related to the human driving force is greater than or equal to a first value and shifts the control state to the second control state in a case where the parameter related to the human driving force is less than or equal to a second value. The first value is greater than the second value. The human-powered vehicle control device according to the fourteenth aspect is not likely to restrict the shifting action of the derailleur in a case where the parameter related to the human driving force is greater than or equal to the first value, and reduces the driving force of the motor during the shifting action in a case where the parameter related to the human driving force is less than or equal to the second value. Thus, the shifting action of the derailleur is appropriately performed.

In accordance with a fifteenth aspect of the present disclosure, the human-powered vehicle control device according to the fourteenth aspect is configured so that the second value is less than or equal to 10 Nm. The human-powered vehicle control device according to the fifteenth aspect reduces the driving force of the motor during the shifting action in a case where the parameter related to the human driving force is less than or equal to the second value that is less than or equal to 10 Nm.

In accordance with a sixteenth aspect of the present disclosure, the human-powered vehicle control device according to the fifteenth aspect is configured so that the second value is less than or equal to 5 Nm. The human-powered vehicle control device according to the sixteenth aspect reduces the driving force of the motor during the shifting action in a case where the parameter related to the human driving force is less than or equal to the second value that is less than or equal to 5 Nm.

In accordance with a seventeenth aspect of the present disclosure, the human-powered vehicle control device according to any one of the second and thirteenth to sixteenth aspects is configured so that the first value is greater than or equal to 20 Nm. The human-powered vehicle control device according to the seventeenth aspect appropriately performs the shifting action of the derailleur in a case where the parameter related to the human driving force is greater than or equal to the first value that is greater than or equal to 20 Nm.

In accordance with an eighteenth aspect of the present disclosure, the human-powered vehicle control device according to the seventeenth aspect is configured so that the first value is greater than or equal to 30 Nm. The human-powered vehicle control device according to the eighteenth aspect appropriately performs the shifting action of the derailleur in a case where the parameter related to the human driving force is greater than or equal to the first value that is greater than or equal to 30 Nm.

In accordance with a nineteenth aspect of the present disclosure, the human-powered vehicle control device according to any one of the second and thirteenth to eighteenth aspects is configured so that the parameter related to the human driving force includes the human driving force and an assist force of the motor. The human-powered vehicle control device according to the nineteenth aspect appropriately shifts the control state in accordance with the parameter related to the human driving force that includes the human driving force and the assist force of the motor.

In accordance with a twentieth aspect of the present disclosure, the human-powered vehicle control device according to any one of the second and thirteenth to nineteenth aspects is configured so that the human-powered vehicle further includes a first pedal and a second pedal that are coupled to the crank axle. The parameter related to the human driving force includes a first human driving force received from the first pedal and a second human driving force received from the second pedal. The electronic controller is configured to shift the control state to the second control state in a case where one of the first human driving force and the second human driving force is less than or equal to a third value and the other one of the first human driving force and the second human driving force is less than or equal to a fourth value that is less than the third value. The human-powered vehicle control device according to the twentieth aspect reduces the driving force of the motor during the shifting action in a case where one of the first human driving force and the second human driving force is less than or equal to the third value and the other one of the first human driving force and the second human driving force is less than or equal to the fourth value.

A human-powered vehicle control device in accordance with a twenty-first aspect is for a human-powered vehicle. The human-powered vehicle includes a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, a motor configured to drive the transmission body, and a first pedal and a second pedal coupled to the crank axle, a parameter related to the human driving force including a first human driving force received from the first pedal and a second human driving force received from the second pedal. The human-powered vehicle control device comprises an electronic controller configured to control the motor. The electronic controller is configured to drive the transmission body with the motor and operate the transmission body with the derailleur to perform a shifting action that changes the transmission ratio in a case where the crank axle is stopped. The electronic controller is configured to be actuated in a control state including a first control state in which the shifting action is performed and a second control state in which a driving force of the motor during the shifting action is reduced compared to the first control state. The electronic controller is configured to shift the control state to the second control state in a case where one of the first human driving force and the second human driving force is less than or equal to a third value and the other one of the first human driving force and the second human driving force is less than or equal to a fourth value that is less than the third value. The human-powered vehicle control device according to the twenty-first aspect reduces the driving force of the motor during the shifting action in a case where one of the first human driving force and the second human driving force is less than or equal to the third value and the other one of the first human driving force and the second human driving force is less than or equal to the fourth value. Thus, the shifting action of the derailleur is appropriately performed.

In accordance with a twenty-second aspect of the present disclosure, the human-powered vehicle control device according to any one of the first to twentieth aspects is configured so that the electronic controller is configured to shift the control state to the second control state in a case where a parameter related to the human driving force is less than or equal to a fifth value and an acceleration state of the human-powered vehicle continues over a second period. The human-powered vehicle control device according to the twenty-second aspect reduces the driving force of the motor during the shifting action in a case where the parameter related to the human driving force is less than or equal to the fifth value and the acceleration state of the human-powered vehicle continues over the second period.

A human-powered vehicle control device in accordance with a twenty-third aspect is for a human-powered vehicle. The human-powered vehicle includes a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, and a motor configured to drive the transmission body. The human-powered vehicle control device comprises an electronic controller configured to control the motor. The electronic controller is configured to drive the transmission body with the motor and operate the transmission body with the derailleur to perform a shifting action that changes the transmission ratio in a case where the crank axle is at a standstill. The electronic controller is configured to be actuated in a control state including a first control state in which the shifting action is performed and a second control state in which a driving force of the motor during the shifting action is reduced compared to the first control state. The electronic controller is configured to enable an operator of the human-powered vehicle to select the first control state or the second control state. The human-powered vehicle control device according to the twenty-third aspect enables the operator of the human-powered vehicle to select the first control state or the second control state. Thus, the shifting action of the derailleur is appropriately performed.

In accordance with a twenty-fourth aspect of the present disclosure, the human-powered vehicle control device according to the twenty-third aspect is configured so that the human-powered vehicle further includes an operating device. The electronic controller is configured to enable the operator to select the first control state or the second control state by operating the operating device. With the human-powered vehicle control device according to the twenty-fourth aspect, the operator of the human-powered vehicle easily selects the first control state or the second control state by operating the operating device.

In accordance with a twenty-fifth aspect of the present disclosure, the human-powered vehicle control device according to the twenty-fourth aspect is configured so that the operating device includes an operation portion that is operated by the operator and undergoes a first operation and a second operation that differs from the first operation. The electronic controller is configured to control a component of the human-powered vehicle in a case where the first operation is performed on the operation portion and shift the control state to the first control state in a case where the second operation is performed on the operation portion. With the human-powered vehicle control device according to the twenty-fifth aspect, the same operation portion is used to control the component of the human-powered vehicle and shift the control state to the first control state.

In accordance with a twenty-sixth aspect of the present disclosure, the human-powered vehicle control device according to the twenty-fifth aspect is configured so that the component includes the derailleur. The operation portion includes a shifting operation portion configured to operate the derailleur. The electronic controller is configured to control the derailleur in a case where the first operation is performed on the shifting operation portion. With the human-powered vehicle control device according to the twenty-sixth aspect, the shifting operation portion for controlling the derailleur is used to shift the control state to the first control state.

In accordance with a twenty-seventh aspect of the present disclosure, the human-powered vehicle control device according to the twenty-fifth aspect is configured so that the component includes the motor. The operation portion includes an assist operation portion configured to change an assist level of the motor. The electronic controller is configured to change the assist level in a case where the first operation is performed on the assist operation portion. With the human-powered vehicle control device according to the twenty-seventh aspect, the assist operation portion for changing the assist level is used to shift the control state to the first control state.

In accordance with a twenty-eighth aspect of the present disclosure, the human-powered vehicle control device according to any one of the twenty-fifth to twenty-seventh aspects is configured so that the second operation is an operation in which the operation portion is continuously operated over a first time or longer. The human-powered vehicle control device according to the twenty-eighth aspect shifts the control state to the first control state in a case where the operation portion is continuously operated over the first time or longer.

In accordance with a twenty-ninth aspect of the present disclosure, the human-powered vehicle control device according to any one of the twenty-fifth to twenty-seventh aspects is configured so that the second operation is an operation in which the operation portion is operated a predetermined number of times or more during a second time. The human-powered vehicle control device according to the twenty-ninth aspect shifts the control state to the first control state in a case where the operation portion is operated the predetermined number of times or more.

In accordance with a thirtieth aspect of the present disclosure, the human-powered vehicle control device according to any one of the twenty-fifth to twenty-ninth aspects is configured so that the electronic controller is configured to control the derailleur to perform the shifting action for a single stage or multiple stages in a case where a third operation is performed on the operation portion after the second operation. The human-powered vehicle control device according to the thirtieth aspect controls the derailleur to perform the shifting action for a single stage or multiple stages by performing the third operation. Thus, in a case where the operator wishes to perform a shifting action for a single stage or multiple stages, the derailleur is controlled to perform the shifting action by performing the third operation.

In accordance with a thirty-first aspect of the present disclosure, the human-powered vehicle control device according to the thirtieth aspect is configured so that the third operation is performed after the second operation in which the operation portion is continuously operated over a third time or longer and is an operation in which the operation portion is further continuously operated over a fourth time or longer. The human-powered vehicle control device according to the thirty-first aspect controls the derailleur to perform the shifting action for a single stage or multiple stages in a case where the operation portion is continuously operated over the third time or longer in the second operation and then the operation portion is further continuously operated over the fourth time or longer.

In accordance with a thirty-second aspect of the present disclosure, the human-powered vehicle control device according to the thirtieth aspect is configured so that the third operation is performed after the second operation is performed on the operation portion and is an operation in which the operation portion is temporarily released and then operated again within a predetermined time. The human-powered vehicle control device according to the thirty-second aspect controls the derailleur to perform the shifting action for a single stage or multiple stages in a case where after the second operation is performed on the operation portion, the operation portion is released and operated again in the predetermined time.

In accordance with a thirty-third aspect of the present disclosure, the human-powered vehicle control device according to any one of the twenty-fifth to thirty-second aspects is configured so that the electronic controller is configured to shift the control state from the first control state to the second control state in a case where a fourth operation is performed on the operation portion after the second operation. The human-powered vehicle control device according to the thirty-third aspect shifts the control state from the first state to the second state in accordance with the fourth operation performed on the operation portion after the second operation.

In accordance with a thirty-fourth aspect of the present disclosure, the human-powered vehicle control device according to any one of the thirtieth to thirty-second aspects is configured so that the electronic controller is configured to shift the control state from the first control state to the second control state in a case where a fourth operation is performed on the operation portion after the third operation. The human-powered vehicle control device according to the thirty-fourth aspect shifts the control state from the first state to the second state in accordance with the fourth operation performed on the operation portion after the third operation.

In accordance with a thirty-fifth aspect of the present disclosure, the human-powered vehicle control device according to any one of the twenty-fourth to thirty-fourth aspects is configured so that the electronic controller is configured to enable the operator to select the first control state by operating the operating device in a state in which the human-powered vehicle is at a standstill or the operator is dismounted from the human-powered vehicle. The human-powered vehicle control device according to the thirty-fifth aspect enables the operator to select the first control state by operating the operating device in a state in which the human-powered vehicle is at a standstill or the operator is dismounted from the human-powered vehicle. Thus, the control state is shifted to the first control state as intended by the operator in a state in which the human-powered vehicle is at a standstill or the operator is dismounted from the human-powered vehicle.

In accordance with a thirty-sixth aspect of the present disclosure, the human-powered vehicle control device according to any one of the twenty-fourth to thirty-fifth aspects is configured so that the electronic controller is configured to perform the shifting action in a case where the wheel is separated from ground in the first control state. The human-powered vehicle control device according to the thirty-sixth aspect performs the shifting action in a case where the wheel is separated from ground. Thus, the shifting action of the derailleur is appropriately performed.

In accordance with a thirty-seventh aspect of the present disclosure, the human-powered vehicle control device according to any one of the twenty-fourth to thirty-sixth aspects is configured so that the electronic controller is configured to shift the control state to the first control state regardless of operation by the operator in a case where separation of the wheel from ground is detected. The human-powered vehicle control device according to the thirty-seventh aspect shifts the control state to the first control state in a case where the wheel is separated from ground regardless of operation of the operator.

A human-powered vehicle control device in accordance with a thirty-eighth aspect is for a human-powered vehicle. The human-powered vehicle includes a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, and a motor configured to drive the transmission body. The human-powered vehicle control device comprises an electronic controller configured to control the motor. The electronic controller is configured to drive the transmission body with the motor and operate the transmission body with the derailleur to perform a shifting action that changes the transmission ratio in a case where the crank axle is at a standstill. The electronic controller is configured be shift actuated in a control state including a first control state in which the shifting action is performed and a second control state in which a driving force of the motor during the shifting action is reduced compared to the first control state. The electronic controller is configured to shift the control state to the second control state in a case where an uphill is detected ahead in a traveling direction of the human-powered vehicle in a case where the human-powered vehicle is accelerating or traveling downhill. The human-powered vehicle control device according to the thirty-eighth aspect shifts the control state to the second control state in a case where an uphill is detected ahead in a traveling direction of the human-powered vehicle in a case where the human-powered vehicle is accelerating or traveling downhill. This allows the speed stage of a transmission device to be changed to a speed stage suitable for the uphill. Thus, the shifting action of the derailleur is appropriately performed.

In accordance with a thirty-ninth aspect of the present disclosure, the human-powered vehicle control device according to the thirty-eighth aspect is configured so that the control state of the electronic controller further includes a third control state in which the shifting action is performed and which differs from the first control state. The electronic controller is configured to shift the control state to the third control state after shifting to the second control state and before reaching the uphill. The shifting action performed during the third control state is a shift down. The human-powered vehicle control device according to the thirty-ninth aspect performs a shift down in the third control state before reaching an uphill. This reduces the load to start pedaling on the uphill.

In accordance with a fortieth aspect of the present disclosure, the human-powered vehicle control device according to any one of the first to thirty-ninth aspects is configured so that in a case where the first control state continues for a fifth time or longer, the electronic controller is configured to shift the control state to the second control state. The human-powered vehicle control device according to the fortieth aspect shifts the control state to the second control state in a case where the first control state continues for the fifth time or longer.

In accordance with a forty-first aspect of the present disclosure, the human-powered vehicle control device according to any one of the first to fortieth aspects is configured so that in a case where a load that is greater than or equal to a second load is applied to the motor in the first control state, the electronic controller is configured to shift the control state to the second control state. The human-powered vehicle control device according to the forty-first aspect shifts the control state to the second control state in a case where a load that is greater than or equal to the second load is applied to the motor in the first control state. Thus, for example, in a case where an object is present in a transmission path of driving force of the motor and causes an increase in the load on the motor, the shifting action is restricted in a state in which the driving force of the motor is large.

In accordance with a forty-second aspect of the present disclosure, the human-powered vehicle control device according to any one of the first to forty-first aspects is configured so that in a case where the human-powered vehicle starts traveling in the first control state, the electronic controller shifts the control state to the second control state. The human-powered vehicle control device according to the forty-second aspect shifts the control state to the second control state in a case where the human-powered vehicle starts traveling in the first control state. This restricts the shifting action in a state in which the driving force of the motor is large in a case where the pedaling starts.

In accordance with a forty-third aspect of the present disclosure, the human-powered vehicle control device according to any one of the first to forty-second aspects is configured so that the human-powered vehicle further includes a notification unit. The electronic controller is configured to control the notification unit. The electronic controller is configured to control the notification unit and issue a notification with the notification unit in a case where the electronic controller shifts the control state from the second control state to the first control state. The human-powered vehicle control device according to the forty-third aspect controls the notification unit to issue a notification with the notification unit in a case where the control state shifts from the second control state to the first control state. Thus, the user of the human-powered vehicle recognizes the shifting of the control state from the second control state to the first control state.

In accordance with a forty-fourth aspect of the present disclosure, the human-powered vehicle control device according to any one of the first to forty-third aspects is configured so that in a case where the crank axle is at a standstill in the first control state, the electronic controller is configured to shift the control state to the second control state. The human-powered vehicle control device according to the forty-fourth aspect shifts the control state to the second control state in a case where the crank axle is stopped in the first control state. Thus, in a case where the crank axle is stopped, the driving force of the motor during the shifting action is reduced.

In accordance with a forty-fifth aspect of the present disclosure, the human-powered vehicle control device according to any one of the first to forty-fourth aspects is configured so that the electronic controller is configured to control the motor to disable the shifting action in the second control state. The human-powered vehicle control device according to the forty-fifth aspect controls the motor to disable the shifting action in the second control state.

A human-powered vehicle control device in accordance with a forty-sixth aspect is for a human-powered vehicle. The human-powered vehicle includes a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, a motor configured to drive the transmission body, and an operating device. The human-powered vehicle control device comprises an electronic controller configured to control the motor. The operating device includes a shifting operation portion configured to operate the derailleur and an assist operation portion configured to change an assist level of the motor. The electronic controller is configured to drive the transmission body with the motor and operate the transmission body with the derailleur to perform a shifting action that changes the transmission ratio in a case where the crank axle is at a standstill. The electronic controller is configured to be actuated in a control state including a fourth control state. The electronic controller, in the fourth control state, is configured to perform the shifting action in a case where the shifting operation portion is operated and configured to drive the motor to assist in walking the human-powered vehicle in a case where the assist operation portion is operated. The human-powered vehicle control device according to the forty-sixth aspect performs the shifting action in a case where the shifting operation portion is operated, and drives the motor to assist in walking the human-powered vehicle in a case where the assist operation portion is operated in the fourth control state. Thus, in the fourth control state, the shifting action of the derailleur is appropriately performed as intended by the operator.

In accordance with a forty-seventh aspect of the present disclosure, the human-powered vehicle control device according to the forty-sixth aspect is configured so that the electronic controller is configured to shift the control state to the fourth control state in a case where the shifting operation portion or the assist operation portion is operated. The human-powered vehicle control device according to the forty-seventh aspect shifts the control state to the fourth control state in a case where the shifting operation portion or the assist operation portion is operated.

In accordance with a forty-eighth aspect of the present disclosure, the human-powered vehicle control device according to the forty-sixth or forty-seventh aspect is configured so that the electronic controller is configured to shift the control state to the fourth control state in a case where the shifting operation portion or the assist operation portion is operated over a sixth time or longer. The human-powered vehicle control device according to the forty-eighth aspect shifts the control state to the fourth control state in a case where the shifting operation portion or the assist operation portion is operated over the sixth time or longer.

In accordance with a forty-ninth aspect of the present disclosure, the human-powered vehicle control device according to any one of the forty-sixth to forty-eighth aspects is configured so that the electronic controller, in the fourth control state, is configured to cancel the fourth control state in a case where the shifting operation portion or the assist operation portion is operated over a seventh time or longer. The human-powered vehicle control device according to the forty-ninth aspect cancels the fourth control state in a case where the shifting operation portion or the assist operation portion is operated over the seventh time or longer.

In accordance with a fiftieth aspect of the present disclosure, the human-powered vehicle control device according to any one of the forty-sixth to forty-ninth aspects is configured so that in a case where the crank axle rotates during the shifting action in the fourth control state, the electronic controller is configured to continue the shifting action without any interruption until the shifting action is completed. The human-powered vehicle control device according to the fiftieth aspect continues the shifting action without any interruption until the shifting action is completed in a case where the crank axle rotates during the shifting action in the fourth control state. Thus, even in a case where the pedaling is started during the shifting action, the shifting action is completed.

The human-powered vehicle control device according to the present disclosure appropriately performs a shifting action of the derailleur.

BRIEF DESCRIPTION OF THE DRAWINGS

Referring now to the attached drawings which form a part of this original disclosure.

DETAILED DESCRIPTION OF EMBODIMENTS

Figure 1:
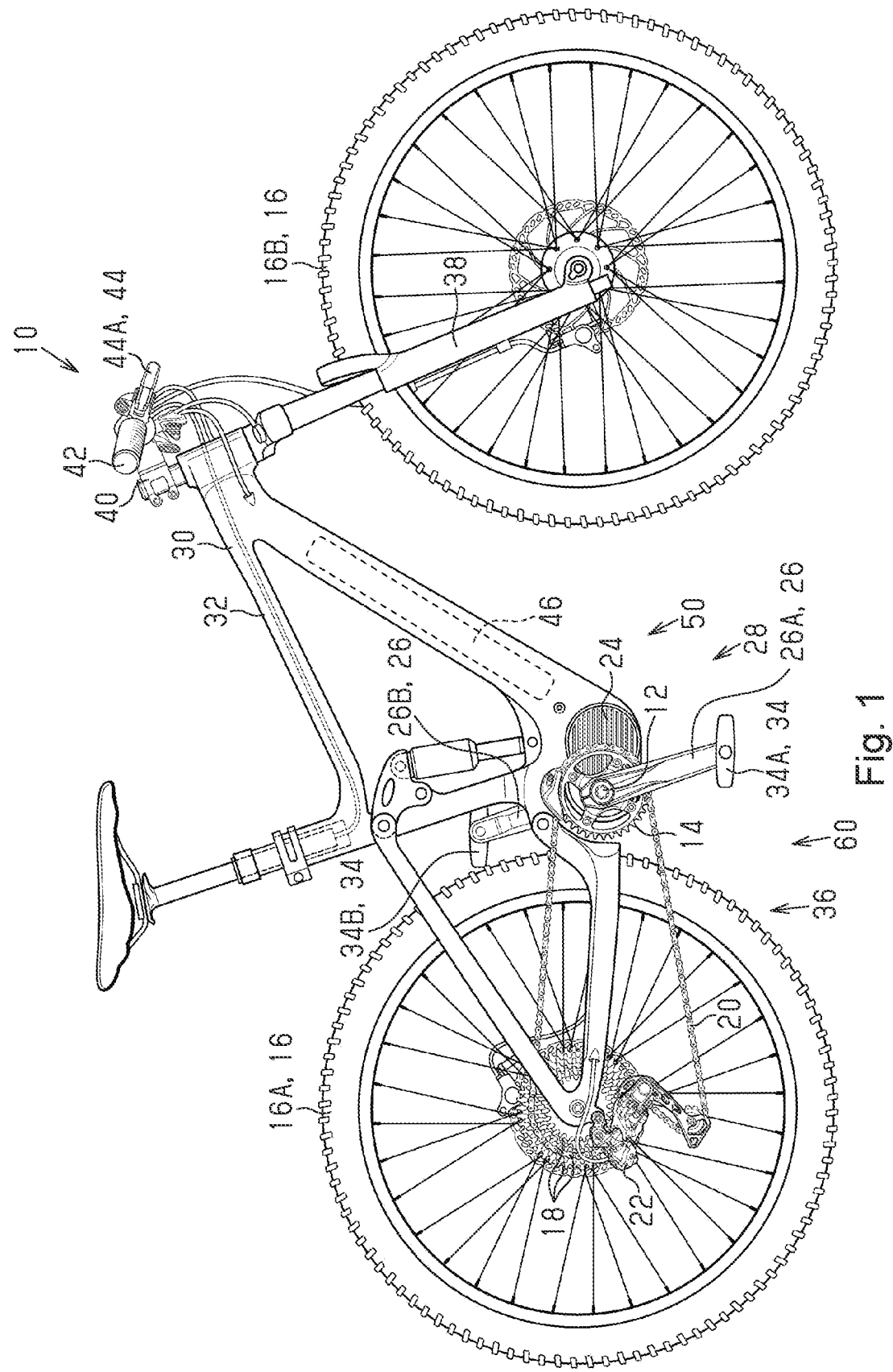
FIG. 1 is a side elevational view of a human-powered vehicle including a human-powered vehicle control device in accordance with a first embodiment.
Figure 2:
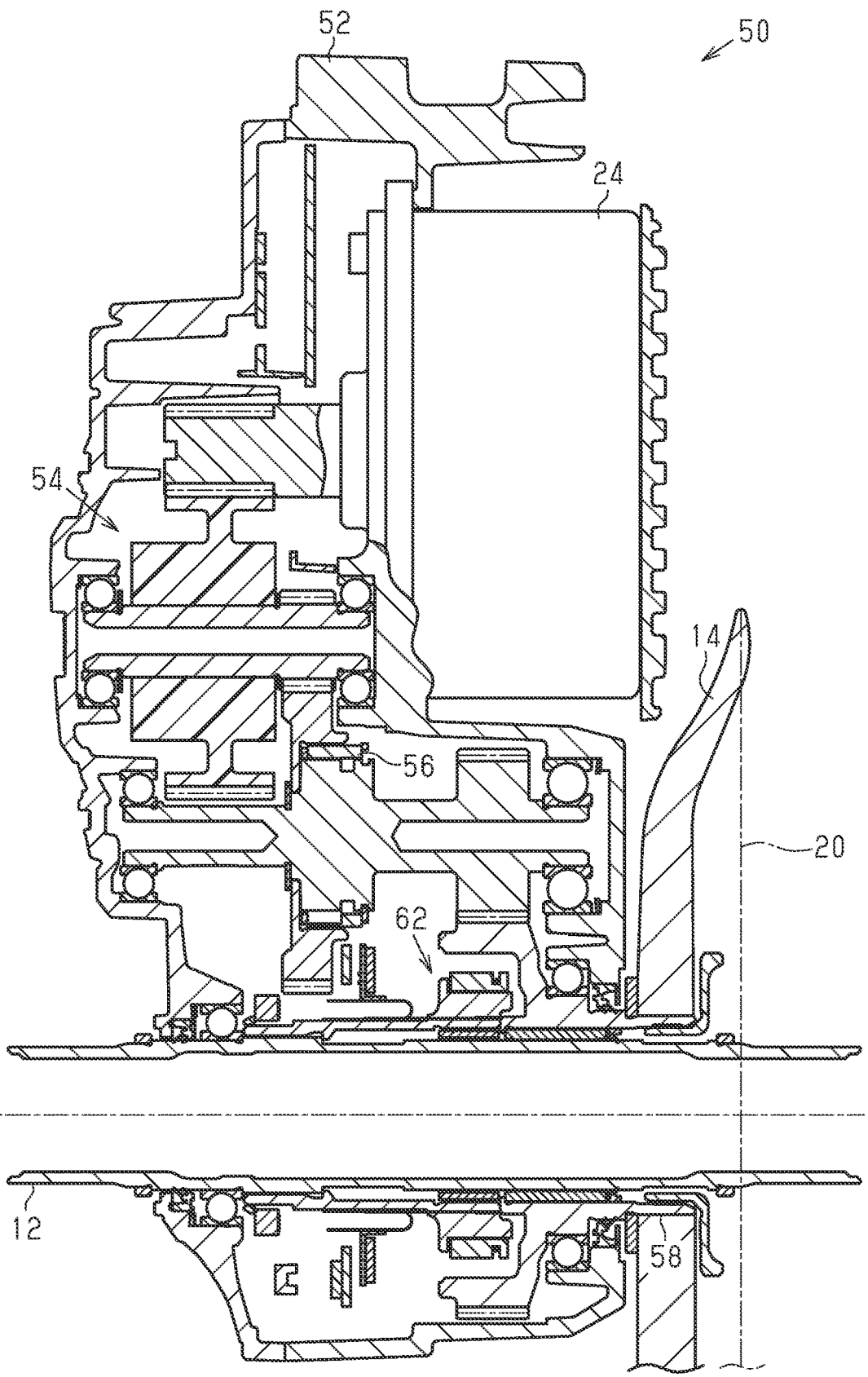
FIG. 2 is a cross-sectional view of a drive unit included in the human-powered vehicle shown in FIG. 1.
Figure 3:
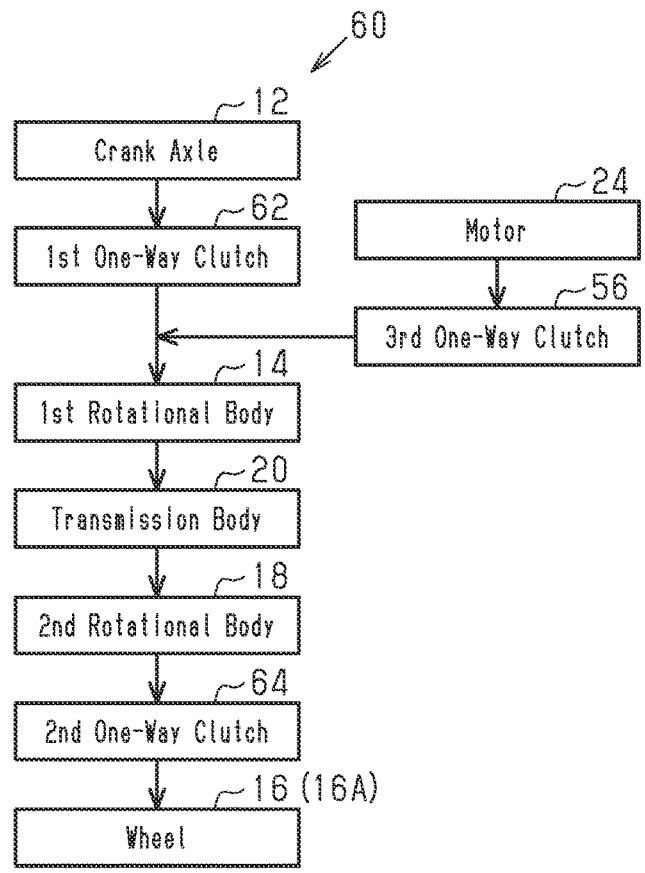
FIG. 3 is a diagram showing a power transmission path in a power transmission system of the human-powered vehicle shown in FIG. 1.

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

First Embodiment

A first embodiment of a human-powered vehicle control device 70 for a human-powered vehicle will now be described with reference to FIGS. 1 to 5. A human-powered vehicle 10 is a vehicle including at least one wheel and is driven by at least human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 includes an E-bike that uses driving force of an electric motor in addition to a human driving force H for propulsion. The E-bike includes an electric assist bicycle that assists in propulsion with an electric motor. In the embodiments described below, the human-powered vehicle 10 refers to an electric assist mountain bike.

The human-powered vehicle 10 includes a crank axle 12, a first rotational body 14, a wheel 16, a second rotational body 18, a transmission body 20, a derailleur 22, and a motor 24. The human-powered vehicle 10 further includes two crank arms 26. The crank axle 12 and the crank arms 26 form a crank 28. The human driving force H is input to the crank axle 12. The human-powered vehicle 10 further includes a body 30. The wheel 16 includes a rear wheel 16A and a front wheel 16B. The body 30 includes a frame 32. The crank 28 is rotatable relative to the frame 32. The crank arms 26 include a first crank arm 26A and a second crank arm 26B. The first crank arm 26A is provided on one axial end of the crank axle 12. The second crank arm 26B is provided on the other axial end of the crank axle 12. The human-powered vehicle 10 includes pedals 34. The human-powered vehicle 10 includes a first pedal 34A and a second pedal 34B coupled to the crank axle 12. The pedals 34 include the first pedal 34A and the second pedal 34B. The first pedal 34A is coupled to the first crank arm 26A. The second pedal 34B is coupled to the second crank arm 26B. The rear wheel 16A is driven in accordance with rotation of the crank 28. The rear wheel 16A is supported by the frame 32. The crank 28 and the rear wheel 16A are coupled by a drive mechanism 36.

The drive mechanism 36 includes the first rotational body 14, the second rotational body 18, and the transmission body 20. The first rotational body 14 is connected to the crank axle 12. The second rotational body 18 is connected to the wheel 16. The transmission body 20 is engaged with the first rotational body 14 and the second rotational body 18, and is configured to transmit driving force between the first rotational body 14 and the second rotational body 18. The transmission body 20 transmits rotational force of the first rotational body 14 to the second rotational body 18. In the present embodiment, the first rotational body 14 is coaxial with the crank axle 12. However, the first rotational body 14 can be configured not to be coaxial with the crank axle 12. In a case where the first rotational body 14 is not coaxial with the crank axle 12, the first rotational body 14 and the crank axle 12 are connected by a first transmission mechanism including at least one of a gear, a pulley, a chain, a shaft, and a belt. In the present embodiment, the second rotational body 18 is coaxial with the rear wheel 16A. However, the second rotational body 18 can be configured not to be coaxial with the rear wheel 16A. In a case where the second rotational body 18 is not coaxial with the rear wheel 16A, the second rotational body 18 and the rear wheel 16A are connected by a second transmission mechanism including at least one of a gear, a pulley, a chain, a shaft, and a belt.

The front wheel 16B is attached to the frame 32 by a front fork 38. The front fork 38 is coupled to a handlebar 42 by a stem 40. In the present embodiment, the rear wheel 16A is coupled to the crank 28 by the drive mechanism 36. However, any one of the rear wheel 16A and the front wheel 16B can be coupled to the crank 28 by the drive mechanism 36.

The derailleur 22 is configured to operate the transmission body 20 to change a transmission ratio R of rotational speed W of the wheel 16 to rotational speed C of the crank axle 12. The relation of the transmission ratio R, the rotational speed W, and the rotational speed C is expressed by Equation (1). The derailleur 22 is, for example, configured to change the transmission ratio R in a stepped manner.

Transmission Ratio $R$=Rotational Speed $W$/Rotational Speed $C$            Equation (1):

The derailleur 22 includes, for example, at least one of a front derailleur and a rear derailleur. In a case where the derailleur 22 includes a rear derailleur, the first rotational body 14 includes at least one sprocket, the second rotational body 18 include a plurality of sprockets, and the transmission body 20 includes a chain. In a case where the derailleur 22 includes a rear derailleur, the derailleur 22 moves the chain, which is engaged with one of the sprockets of the second rotational body 18, to another one of the sprockets that is engaged with the chain. In a case where the derailleur 22 includes a front derailleur, the first rotational body 14 includes a plurality of sprockets, the second rotational body 18 includes at least one sprocket, and the transmission body 20 includes a chain. In a case where the derailleur 22 includes a front derailleur, the derailleur 22 moves the chain, which is engaged with one of the sprockets of the first rotational body 14, to another one of the sprockets. The derailleur 22 operates the transmission body 20 to change the transmission ratio R by changing the engagement state of the transmission body 20 with at least one of the first rotational body 14 and the second rotational body 18.

The first rotational body 14 and the second rotational body 18 can be provided on a gear box. The gear box is, for example, provided in the vicinity of the crank axle 12. In a case where the first rotational body 14 and the second rotational body 18 are provided on the gear box, at least one of the first rotational body 14 and the second rotational body 18 includes multiple sprockets, and the derailleur 22 is provided on the gear box and is configured to change the engagement state of the transmission body 20 with at least one of the first rotational body 14 and the second rotational body 18.

Preferably, the human-powered vehicle 10 further includes an operating device 44 configured to operate the derailleur 22. The operating device 44 is provided, for example, on the handlebar 42. The operating device 44 is configured to be operated by a user using his or her hand, finger, or the like. The operating device 44 includes at least a first operation portion 44A and a second operation portion 44B.

The first operation portion 44A and the second operation portion 44B include, for example, a button switch or a lever switch. The first operation portion 44A and the second operation portion 44B are not limited to a button switch or a lever switch and can have any configuration that changes between at least two states in accordance with operation of the user.

The first operation portion 44A and the second operation portion 44B are configured to operate the derailleur 22. The operating device 44 outputs a shifting operating signal to the electronic controller 72 of the human-powered vehicle control device 70 in accordance with operation of the user. In addition to or instead of the first operation portion 44A and the second operation portion 44B, the operating device 44 can include a third operation portion configured to operate a human-powered vehicle component other than the derailleur 22. The human-powered vehicle component includes, for example, at least one of a cycle computer, a suspension device 88, an adjustable seatpost, a lamp, and a drive unit 50. The shifting operating signal includes, for example, a first operating signal including an instruction to operate the derailleur 22 to increase the transmission ratio R and a second operating signal including an instruction to operate the derailleur 22 to decrease the transmission ratio R.

The operating device 44 outputs the first operating signal in a case where the first operation portion 44A is operated, and outputs the second operating signal in a case where the second operation portion 44B is operated. In the present embodiment, the rear derailleur is operated by the first operation portion 44A and the second operation portion 44B. Alternatively, the front derailleur can be operated by the first operation portion 44A and the second operation portion 44B. Both the rear derailleur and the front derailleur can be operated by the first operation portion 44A and the second operation portion 44B. The operating device 44 can further include a third operation portion and a fourth operation portion in addition to the first operation portion 44A and the second operation portion 44B. The third operation portion and the fourth operation portion are, for example, configured in the same manner as the first operation portion 44A and the second operation portion 44B. The rear derailleur can be operated by one of the set of the first operation portion 44A and the second operation portion 44B and the set of the third operation portion and the fourth operation portion. The front derailleur can be operated by the other one of the set of the first operation portion 44A and the second operation portion 44B and the set of the third operation portion and the fourth operation portion.

Preferably, the human-powered vehicle 10 further includes an electric actuator 48 configured to operate the derailleur 22. The electric actuator 48 includes, for example, an electric motor. The electric actuator 48 can further include, for example, a speed reducer coupled to an output shaft of the electric motor. The electric actuator 48 can be provided on the derailleur 22 or can be provided on the human-powered vehicle 10 at a position separate from the derailleur 22. The electric actuator 48 is driven so that the derailleur 22 operates the transmission body 20 to perform shifting. The derailleur 22 includes, for example, a base member, a movable member, and a link member that movably couples the movable member to the base member. The movable member includes a guide member that guides a coupling member. The guide member includes, for example, a guide plate and a pulley. The electric actuator 48 can, for example, directly drive the link member. The electric actuator 48 can drive the link member using a cable.

Preferably, the human-powered vehicle 10 further includes a battery 46. The battery 46 includes one or more battery elements. The battery elements include a rechargeable battery. The battery 46 is configured to supply electric power to the human-powered vehicle control device 70. Preferably, the battery 46 is also configured to supply electric power to the electric actuator 48. Preferably, the battery 46 is connected to the electronic controller 72 of the human-powered vehicle control device 70 through wired or wireless communication. The battery 46 is configured to communicate with the electronic controller 72 through, for example, power line communication (PLC), controller area network (CAN), or universal asynchronous receiver/transmitter (UART).

The motor 24 is configured to drive the transmission body 20. Preferably, the motor 24 is configured to apply a propulsion force to the human-powered vehicle 10 in accordance with the human driving force H. The motor 24 includes one or more electric motors. The electric motor of the motor 24 is, for example, a brushless motor. The motor 24 is configured to transmit a rotational force to the power transmission path of the human driving force H extending from the pedals 34 to the second rotational body 18. In the present embodiment, the motor 24 is provided on the frame 32 of the human-powered vehicle 10 and is configured to transmit a rotational force to the first rotational body 14. The motor 24 drives the transmission body 20 via the first rotational body 14. The human-powered vehicle 10 further includes a housing 52 on which the motor 24 is provided. The drive unit 50 includes the motor 24 and the housing 52. The housing 52 is attached to the frame 32. The housing 52 rotationally supports the crank axle 12. The motor 24 can be configured to transmit rotational force to the transmission body 20, for example, without using the first rotational body 14. In this case, for example, a sprocket configured to engage with the transmission body 20 is provided on the output shaft of the motor 24 or a transmission member configured to receive force from the output shaft. Thus, the motor 38 constitutes an assist motor.

A speed reducer 54 can be provided between the motor 24 and the power transmission path of the human driving force H. The speed reducer 54 is, for example, configured to include gears. Preferably, a third one-way clutch 56 can be provided between the motor 24 and the power transmission path of the human driving force H to restrict transmission of the rotational force of the crank 28 to the motor 24 in a case where the crank axle 12 is rotated in a direction in which the human-powered vehicle 10 travels forward. The third one-way clutch 56 includes, for example, at least one of a roller clutch, a sprag-type clutch, and a pawl-type clutch.

The drive unit 50 includes an output portion 58. The output portion 58 is, for example, coupled to the crank axle 12 and the speed reducer 54. The human driving force H and the output of the motor 24 are input to the output portion 58. The first rotational body 14 is coupled to the output portion 58 so as to rotate integrally with the output portion 58.

Preferably, a power transmission system 60 includes the human-powered vehicle control device 70 and a first one-way clutch 62. The first one-way clutch 62 is provided in a first power transmission path between the crank axle 12 and the first rotational body 14, and configured to transmit rotational force from the crank axle 12 to the first rotational body 14 in a first rotational direction and restrict transmission of rotational force from the first rotational body 14 to the crank axle 12 in the first rotational direction. The first one-way clutch 62 is configured to rotate the first rotational body 14 forward in a case where the crank 28 rotates forward, and allow relative rotation of the crank 28 and the first rotational body 14 in a case where the crank 28 rotates rearward. The first one-way clutch 62 is provided, for example, on the housing 52 of the drive unit 50. The first one-way clutch 62 is provided, for example, between the crank axle 12 and the output portion 58. The first one-way clutch 62 includes, for example, at least one of a roller clutch, a sprag-type clutch, and a pawl-type clutch.

The crank axle 12 and the first rotational body 14 can be coupled so as to rotate integrally with each other. In a case where the crank axle 12 and the first rotational body 14 are coupled so as to rotate integrally with each other, the first one-way clutch 62 is omitted.

Preferably, the power transmission system 60 further includes a second one-way clutch 64. The second one-way clutch 64 is provided in a second power transmission path between the second rotational body 18 and the wheel 16 and configured to transmit rotational force from the second rotational body 18 to the wheel 16 in a second rotational direction corresponding to the first rotational direction and restrict transmission of rotational force from the wheel 16 to the second rotational body 18 in the second rotational direction. The second one-way clutch 64 is configured to rotate the rear wheel 16A forward in a case where the second rotational body 18 rotates forward, and allow relative rotation of the second rotational body 18 and the rear wheel 16A in a case where the second rotational body 18 rotates rearward. The second one-way clutch 64 is provided, for example, on a hub axle of the rear wheel 16A. The second one-way clutch 64 includes, for example, at least one of a roller clutch, a sprag-type clutch, and a pawl-type clutch.

The second rotational body 18 and the rear wheel 16A can be coupled so as to rotate integrally with each other. In a case where the second rotational body 18 and the rear wheel 16A are coupled so as to rotate integrally with each other, the second one-way clutch 64 is omitted.

Preferably, the power transmission system 60 further includes a power storage device. The power storage device is configured to store electric power generated by the motor 24. Preferably, the electronic controller 72 is configured to control the motor 24 using electric power of the power storage device. The power storage device can include the battery 46, a battery different from the battery 46, or a capacitor. The power storage device is provided, for example, on the housing 52 of the drive unit 50.

The human-powered vehicle control device 70 includes the electronic controller 72. The electronic controller 72 includes at least one processor 72A that executes a predetermined control program. The processor 72A of the electronic controller 72 includes, for example, a central processing unit (CPU) or a micro processing unit (MPU). The processor 72A of the electronic controller 72 can include parts provided at positions separate from each other. For example, some parts of the processor 72A can be provided on the human-powered vehicle 10, and other parts of the processor 72A can be provided on a server connected to the Internet. In a case where the processor 72A includes parts provided at positions separate from each other, the parts of the processor 72A are connected so as to communicate with each other via a wireless communication device. The electronic controller 72 can include one or more microcomputers. Thus, the term "electronic controller" as used herein refers to hardware that executes a software program, and does not include a human.

Preferably, the human-powered vehicle control device 70 further includes storage 74. The storage 74 stores a control program and information used for a control process. The storage 74 includes any computer storage device or any non-transitory computer-readable medium with the sole exception of a transitory, propagating signal. For example, the storage 74 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Preferably, the human-powered vehicle control device 70 further includes a drive circuit 76 of the motor 24. Preferably, the drive circuit 76 and the electronic controller 72 are provided on the housing 52 of the drive unit 50. The drive circuit 76 and the electronic controller 72 can be provided, for example, on the same circuit substrate. The drive circuit 76 includes an inverter circuit. The drive circuit 76 controls electric power supplied from the battery 46 to the motor 24. The drive circuit 76 is connected to the electronic controller 72 by a conductive wire, an electric cable, or a wireless communication device. The drive circuit 76 drives the motor 24 in accordance with a control signal from the electronic controller 72.

Preferably, the human-powered vehicle control device 70 further includes a vehicle speed sensor 78, a crank rotation sensor 80, and a human driving force detector 82. The terms "sensor" and as "detector" used herein refers to a hardware device or instrument designed to detect the presence or absence of a particular event, object, substance, or a change in its environment, and to emit a signal in response. The terms "sensor" and as "detector" as used herein does not include a human.

The vehicle speed sensor 78 is configured to detect information corresponding to the rotational speed W of the wheel 16 of the human-powered vehicle 10. Preferably, the vehicle speed sensor 78 is configured to detect a magnet provided on the wheel 16 of the human-powered vehicle 10. The vehicle speed sensor 78 is configured to, for example, output detection signals a predetermined number of times in one rotation of the wheel 16. The predetermined number of times is, for example, one. The vehicle speed sensor 78 outputs a signal corresponding to the rotational speed W of the wheel 16. The electronic controller 72 calculates a vehicle speed V of the human-powered vehicle 10 based on the rotational speed W of the wheel 16. The vehicle speed V is calculated based on the rotational speed W of the wheel 16 and information related to the circumferential length of the wheel 16. The information related to the circumferential length of the wheel 16 is stored in the storage 74.

The vehicle speed sensor 78 includes, for example, a magnetic reed forming a reed switch or a Hall element. The vehicle speed sensor 78 can be attached to a chainstay of the frame 32 of the human-powered vehicle 10 and configured to detect a magnet attached to the rear wheel 16A or can be provided on the front fork 38 and configured to detect a magnet attached to the front wheel 16B. In the present embodiment, the vehicle speed sensor 78 is configured so that the reed switch detects the magnet once in one rotation of the wheel 16. The vehicle speed sensor 78 can have any configuration that detects information corresponding to the rotational speed W of the wheel 16 of the human-powered vehicle 10 and can include, for example, an optical sensor or an acceleration sensor. The vehicle speed sensor 78 is connected to the electronic controller 72 by a wireless communication device or an electric cable.

The crank rotation sensor 80 is configured to detect information corresponding to the rotational speed C of the crank axle 12 of the human-powered vehicle 10. The crank rotation sensor 80 is provided, for example, on the frame 32 of the human-powered vehicle 10 or the drive unit 50. The crank rotation sensor 80 is configured to include a magnetic sensor that outputs a signal corresponding to the strength of the magnetic field. An annular magnet having a magnetic field, the strength of which changes in the circumferential direction, is provided on the crank axle 12, a member that rotates in cooperation with the crank axle 12, or the power transmission path between the crank axle 12 and the first rotational body 14. The member that rotates in cooperation with the crank axle 12 can include the output shaft of the motor 24. The crank rotation sensor 80 outputs a signal corresponding to the rotational speed C of the crank axle 12.

The magnet can be provided on a member that rotates integrally with the crank axle 12 in the power transmission path of the human driving force H between the crank axle 12 and the first rotational body 14. For example, in a case where the first one-way clutch 62 is not provided between the crank axle 12 and the first rotational body 14, the magnet can be provided on the first rotational body 14. The crank rotation sensor 80 can have any configuration that detects information corresponding to the rotational speed C of the crank axle 12 of the human-powered vehicle 10 and can include, for example, an optical sensor, an acceleration sensor, or a torque sensor instead of the magnetic sensor. The crank rotation sensor 80 is connected to the electronic controller 72 by a wireless communication device or an electric cable.

The human driving force detector 82 is configured to detect information related to the human driving force H. The human driving force detector 82 is provided, for example, on the frame 32 of the human-powered vehicle 10, the drive unit 50, the crank 28, or the pedals 34. The human driving force detector 82 can be provided on the housing 52 of the drive unit 50. The human driving force detector 82 includes, for example, a torque sensor. The torque sensor is configured to output a signal corresponding to torque applied to the crank 28 by the human driving force H. For example, in a case where the first one-way clutch 62 is provided on the power transmission path, it is preferred that the torque sensor is provided at the upstream side of the first one-way clutch 62 in the power transmission path. The torque sensor includes, for example, a strain sensor, a magnetostrictive sensor, or a pressure sensor. The strain sensor includes a strain gauge.

The torque sensor is provided in the power transmission path or the vicinity of a member included in the power transmission path. The member included in the power transmission path is, for example, the crank axle 12, a member that transmits the human driving force H between the crank axle 12 and the first rotational body 14, the crank arms 26, or the pedals 34. The human driving force detector 82 is connected to the electronic controller 72 via a wireless communication device or an electric cable. The human driving force detector 82 can have any configuration that obtains information related to the human driving force H and can include, for example, a sensor that detects pressure applied to the pedals 34 or a sensor that detects tension of a chain.

The electronic controller 72 is configured to control the motor 24. The electronic controller 72 is configured to control the motor 24, for example, so that an assist level A of the motor 24 equals a predetermined assist level A. Preferably, the assist level A includes at least one of a ratio of output of the motor 24 to the human driving force H that is input to the human-powered vehicle 10, a maximum value of output of the motor 24, and a restriction level L that restricts changes in output of the motor 24 in a case where the output of the motor 24 decreases. The ratio of the assist force of the motor 24 to the human driving force H can be also referred to as the assist ratio. The electronic controller 72 is configured to control the motor 24, for example, so that the ratio of the assist force of the motor 24 to the human driving force H equals a predetermined ratio. The human driving force H corresponds to propulsion force of the human-powered vehicle 10 that is generated by the rider rotating the crank axle 12. The assist force corresponds to propulsion force of the human-powered vehicle 10 that is generated by rotation of the motor 24. The predetermined ratio is not fixed and can be changed, for example, in accordance with the human driving force H, the rotational speed C of the crank axle 12, or the vehicle speed V, or any two or all of the human driving force H, the rotational speed C of the crank axle 12, and the vehicle speed V.

In a case where the human driving force H and the assist force are expressed as torque, the human driving force H is referred to as a human torque HT, and the assist force is referred to as assist torque MT. In a case the human driving force H and the assist force are expressed as power, the human driving force H is referred to as a human power HW, and the assist force is referred to as assist power MW. The ratio can be a torque ratio of the assist torque MT to the human torque HT of the human-powered vehicle 10 or can be a ratio of the assist power MW of the motor 24 to the human power HW.

In the drive unit 50 of the present embodiment, the crank axle 12 is connected to the first rotational body 14 without using a shifting device, and output of the motor 24 is input to the first rotational body 14. In a case where the crank axle 12 is connected to the first rotational body 14 without using a shifting device and output of the motor 24 is input to the first rotational body 14, the human driving force H corresponds to driving force that is generated by the user by rotating the crank axle 12 and is input to the first rotational body 14. In a case where the crank axle 12 is connected to the first rotational body 14 without using a shifting device and output of the motor 24 is input to the first rotational body 14, the assist force corresponds to driving force that is generated by rotation of the motor 24 and is input to the first rotational body 14. In a case where output of the motor 24 is input to the first rotational body 14 via the speed reducer 54, the assist force corresponds to output of the speed reducer 54.

In a case where the motor 24 is provided on the rear wheel 16A, the human driving force H corresponds to output of the rear wheel 16A driven by only the rider. In a case where the motor 24 is provided on the rear wheel 16A, the assist force corresponds to output of the rear wheel 16A driven by only the motor 24. In a case where the motor 24 is provided on the front wheel 16B, the human driving force H corresponds to output of the rear wheel 16A driven by only the rider. In a case where the motor 24 is provided on the front wheel 16B, the assist force corresponds to output of the front wheel 16B driven by only the motor 24.

The electronic controller 72 is configured to control the motor 24 so that the assist force is less than or equal to a maximum value MX. In a case where output of the motor 24 is input to the first rotational body 14 and the assist force is expressed as torque, the electronic controller 72 is configured to control the motor 24 so that the assist torque MT is less than or equal to a maximum value MTX. Preferably, the maximum value MTX is in a range of 20 Nm or greater and 200 Nm or less. The maximum value MTX is specified, for example, by output characteristics of the motor 24. In a case where output of the motor 24 is input to the first rotational body 14 and the assist force is expressed as power, the electronic controller 72 is configured to control the motor 24 so that the assist power MW is less than or equal to a maximum value MWX.

Preferably, the electronic controller 72 is configured to change the restriction level L of changes in output of the motor 24. As the restriction level L of changes in output of the motor 24 increases, a changing amount of output of the motor 24 per unit time decreases relative to a changing amount of a control parameter of the motor 24 per unit time. As the restriction level L of changes in output of the motor 24 decreases, the changing amount of output of the motor 24 per unit time increases relative to the changing amount of the control parameter of the motor 24 per unit time. The control parameter of the motor 24 is human driving force H or the rotational speed C of the crank axle 12. The restriction level L of changes in output of the motor 24 is inversely proportional to a response speed of the motor 24. The response speed of the motor 24 is expressed as a changing amount of the output of the motor 24 per unit time relative to a changing amount of a control parameter of the motor 24 per unit time. Increases in the restriction level L of changes in output of the motor 24 decrease the response speed of the motor 24.

The electronic controller 72 changes the restriction level L, for example, using a filter. The filter includes, for example, a low-pass filter having a time constant. The electronic controller 72 changes the restriction level L by changing the time constant of the filter. The electronic controller 72 can change the restriction level L by changing a gain for calculating the output of the motor 24 from the human driving force H. The filter is, for example, controlled by a processor executing predetermined software.

Preferably, the electronic controller 72 is configured to control the electric actuator 48. Preferably, the electronic controller 72 is configured to control the electric actuator 48 and the motor 24. The electronic controller 72 outputs a transmission control signal for changing the transmission ratio R to the electric actuator 48. In a case where the transmission control signal is input, the electric actuator 48 is actuated to operate the derailleur 22. The transmission control signal includes, for example, electric power for driving the electric actuator 48. Preferably, the transmission control signal includes a first transmission control signal including an instruction that the electric actuator 48 operates the derailleur 22 to increase the transmission ratio R and a second transmission control signal including an instruction that the electric actuator 48 operates the derailleur 22 to decrease the transmission ratio R.

Preferably, in a case where a shifting condition is satisfied, the electronic controller 72 is configured to control the electric actuator 48 so that the derailleur 22 is actuated to change the transmission ratio R. In a case a shifting condition for increasing the transmission ratio R is satisfied, the electronic controller 72 transmits the first transmission control signal to the electric actuator 48. The electric actuator 48 operates the derailleur 22 to increase the transmission ratio R based on the first transmission control signal. In a case a shifting condition for decreasing the transmission ratio R is satisfied, the electronic controller 72 transmits the second transmission control signal to the electric actuator 48. The electric actuator 48 operates the derailleur 22 to decrease the transmission ratio R based on the second transmission control signal.

The electronic controller 72 is configured to drive the transmission body 20 with the motor 24 and operate the transmission body 20 with the derailleur 22 to perform a shifting action that changes the transmission ratio R in a case where the crank axle 12 is stopped. Such a shifting action can be referred to as a motor shifting action to be distinguished from normal shifting that is performed while the crank axle 12 is rotating.

The electronic controller 72 is actuated in a control state including a first control state in which the shifting action is performed and a second control state in which a driving force of the motor 24 during the shifting action is reduced compared to the first control state. Preferably, the electronic controller 72 controls the motor 24 to disable the shifting action in the second control state. In the second control state, the electronic controller 72 does not drive the motor 24 for performing the shifting action even when the operating device 44 is operated and the shifting condition is satisfied.

The electronic controller 72 shifts the control state to the second control state in a case where the rider is riding the human-powered vehicle 10 and the human-powered vehicle 10 is stopped. Preferably, a parameter P related to the human driving force H includes only the human driving force H. The parameter P related to the human driving force H can include the human driving force H and the assist force of the motor 24. The electronic controller 72 determines that the rider is riding, for example, in a case where the parameter P related to the human driving force H is greater than or equal to a first value P1. The first value P1 is set to a value that can be used to determine that the rider is pedaling the human-powered vehicle 10 so that the human-powered vehicle 10 travels. Preferably, the first value P1 is greater than or equal to 20 Nm. Preferably, the first value P1 is greater than or equal to 30 Nm. Preferably, the first value P1 is less than or equal to 100 Nm.

The electronic controller 72 shifts the control state from the second control state to the first control state in a case where a predetermined condition is satisfied. Preferably, the predetermined condition is satisfied in a case where the parameter P related to the human driving force H is greater than or equal to the first value P1.

Preferably, the electronic controller 72 shifts the control state to the second control state in a case where rotation of the crank axle 12 is stopped in the first control state.

In the present embodiment, for example, in a case where the rider temporarily stops the human-powered vehicle 10 to wait at a traffic signal, the driving of the transmission body 20 with the motor 24 is reduced. Thus, the rider is less likely to feel awkward driving force that would be generated in the human-powered vehicle 10.

Figure 5:
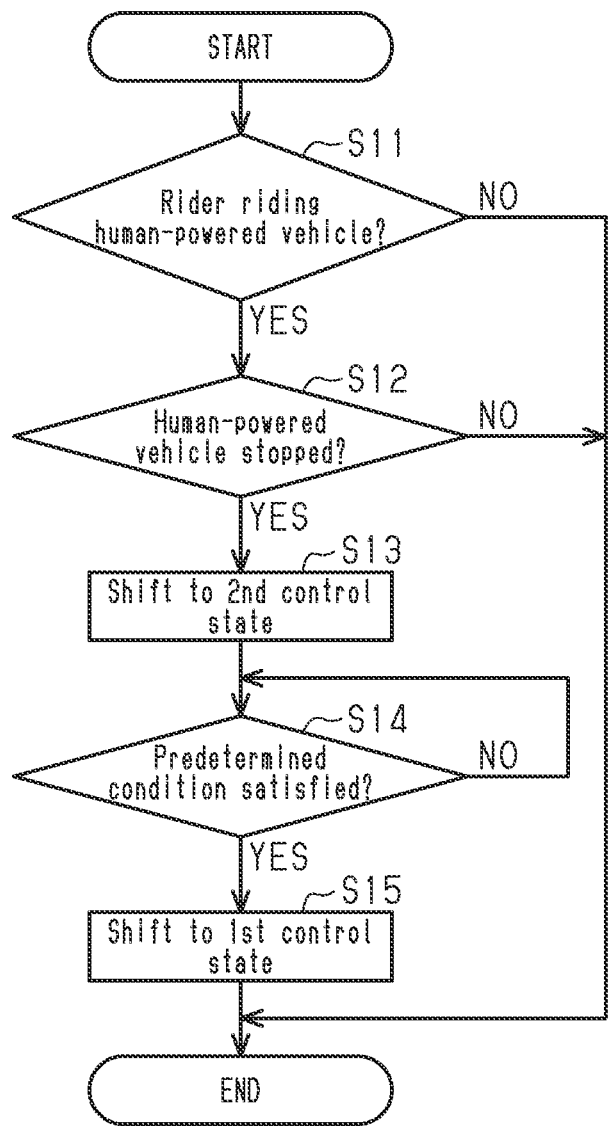
FIG. 5 is a flowchart of a process for changing the control state executed by the electronic controller shown in FIG. 4.

With reference to FIG. 5, a process for shifting the control state of the motor 24 by the electronic controller 72 will now be described. For example, in a case where electric power is supplied to the electronic controller 72, the electronic controller 72 starts the process and proceeds to step S11 of the flowchart shown in FIG. 5. In a case where the flowchart shown in FIG. 5 ends, the electronic controller 72 repeats the process from step S11 after a predetermined interval, for example, until the supply of electric power stops.

In step S11, the electronic controller 72 determines whether a rider is riding the human-powered vehicle 10. In a case where the rider is not riding the human-powered vehicle 10, the electronic controller 72 ends the process. In a case where the rider is riding the human-powered vehicle 10, the electronic controller 72 proceeds to step S12.

In step S12, the electronic controller 72 determines whether the human-powered vehicle 10 is stopped. For example, in a case where the vehicle speed V is less than or equal to 0 km per hour, the electronic controller 72 determines that the human-powered vehicle 10 is stopped. In a case where the human-powered vehicle 10 is not stopped, the electronic controller 72 ends the process. In a case where the human-powered vehicle 10 is stopped, the electronic controller 72 proceeds to step S13.

In step S13, the electronic controller 72 shifts the control state to the second control state and proceeds to step S14.

In step S14, the electronic controller 72 determines whether the predetermined condition is satisfied. In a case where the predetermined condition is not satisfied, the electronic controller 72 again executes step S14. In a case where the predetermined condition is satisfied, the electronic controller 72 proceeds to step S15.

In step S15, the electronic controller 72 shifts the control state to the first control state and ends the process.

Second Embodiment

Figure 6:
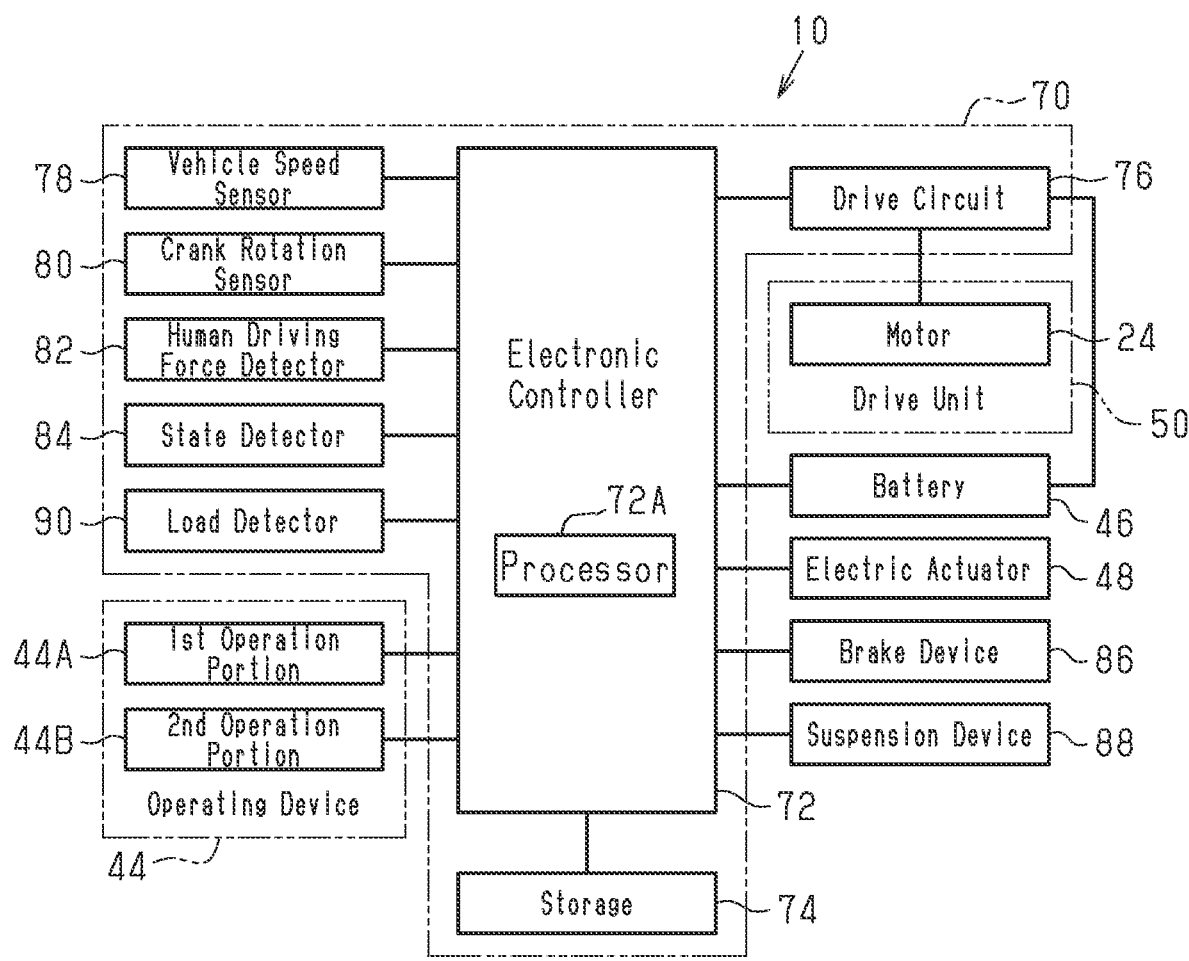
FIG. 6 is a block diagram showing the electrical configuration of a human-powered vehicle including a human-powered vehicle control device for a human-powered vehicle in accordance with second and third embodiments.

A second embodiment of the human-powered vehicle control device 70 will now be described with reference to FIGS. 6 and 7. The human-powered vehicle control device 70 of the second embodiment is the same as the human-powered vehicle control device 70 of the first embodiment except that the electronic controller 72 executes the process of the flowchart shown in FIG. 7 instead of the process of the flowchart shown in FIG. 5. In the human-powered vehicle control device 70 of the second embodiment, same reference characters are given to those elements that are the same as the corresponding elements in the first embodiment. Such elements will not be described in detail.

The electronic controller 72 shifts the control state to the second control state in a case where the rider is riding the human-powered vehicle 10 and at least one of the posture of the body 30 of the human-powered vehicle 10 and the posture of the rider is in a predetermined state. Preferably, the human-powered vehicle control device 70 includes a state detector 84 configured to detect a parameter of the predetermined state.

The predetermined state includes at least one of a first example, a second example, a third example, a fourth example, a fifth example, and a sixth example.

In the first example, the predetermined state includes at least one of a state in which a changing rate of the posture angle of the body 30 of the human-powered vehicle 10 or the posture angle of the rider is greater than a first changing rate and a state in which a repetitive increasing and decreasing frequency of the posture angle of the body 30 of the human-powered vehicle 10 or the posture angle of the rider is greater than a first frequency. Preferably, the posture angle of the body 30 of the human-powered vehicle 10 includes at least one of a roll angle, a yaw angle, and a pitch angle. The electronic controller 72 determines that at least one of the posture of the body 30 of the human-powered vehicle 10 and the posture of the rider is in the predetermined state in at least one of the state in which the changing rate of the posture angle of the body 30 of the human-powered vehicle 10 and the posture angle of the rider is greater than the first changing rate and the case in which the repetitive increasing and decreasing frequency of the posture angle of the body 30 of the human-powered vehicle 10 or the posture angle of the rider is greater than the first frequency.

In the first example, the state detector 84 includes an inclination detector configured to detect an inclination angle of the human-powered vehicle 10. The inclination detector includes, for example, at least one of an inclination sensor and a global positioning system (GPS) receiver. The inclination sensor includes, for example, at least one of a gyro sensor and an acceleration sensor. In a case in which the inclination detector includes a GPS receiver, the storage 74 stores map information including information related to road gradient in advance, and the electronic controller 72 obtains the road gradient on the current position of the human-powered vehicle 10 as the pitch angle.

In the second example, the predetermined state includes the posture of the rider. The electronic controller 72 determines the posture of the rider based on human driving force H and the angle of the crank axle 12. The predetermined state includes a state in which the rider is in a standing pedaling state and is widely moving the human-powered vehicle 10 sideward so that the human-powered vehicle 10 travels. The electronic controller 72 determines that at least one of the posture of the body 30 of the human-powered vehicle 10 and the posture of the rider is in the predetermined state, for example, in a case where the maximum value and the minimum value of human driving force H in a predetermined time greatly differ from each other and the maximum value and the minimum value of the changing rate of the angle of the crank axle 12 in a predetermined time greatly differ from each other.

In the second example, the state detector 84 includes, for example, an inclination detector configured to detect an inclination angle of the human-powered vehicle 10 and the crank rotation sensor 80.

In the third example, the predetermined state includes a contact state of the wheel 16 with ground. The predetermined state includes, for example, a state of the wheel 16 separated from ground. The predetermined state includes, for example, a state of the front wheel 16B separated from ground. The electronic controller 72 determines that at least one of the posture of the body 30 of the human-powered vehicle 10 and the posture of the rider is in the predetermined state, for example, in at least one of a case where a changing rate of the rotational speed W of the wheel 16 in a predetermined time is greater than or equal to a predetermined value and a case where a difference between rotational speed of the rear wheel 16A and rotational speed of the front wheel 16B is greater than or equal to a predetermined difference.

In the third example, the state detector 84 includes, for example, the vehicle speed sensor 78. The state detector 84 can be configured to detect air pressure of the tire corresponding to the wheel 16 or can be configured to detect load on the wheel 16.

In the fourth example, the predetermined state includes a standing pedaling state of the rider. The electronic controller 72 determines that the rider is in the standing pedaling state, for example, in a case where load on the saddle of the body 30 is less than or equal to a predetermined load. The electronic controller 72 can determine the standing pedaling state of the rider based on strain of at least one of the crank 28, the pedals 34, and the frame 32.

In the fifth example, the predetermined state includes an actuation state of a brake device 86 of the human-powered vehicle 10. The electronic controller 72 determines that at least one of the posture of the body 30 of the human-powered vehicle 10 and the posture of the rider is in the predetermined state, for example, in a case where the brake device 86 is actuated.

In the fifth example, the state detector 84 is configured to detect, for example, at least one of an operation state of a brake operating device and an actuation state of a brake actuating device.

In the sixth example, the predetermined state includes an actuation state of the suspension device 88 of the human-powered vehicle 10. For example, the suspension device 88 includes a front suspension device and a rear suspension device. The electronic controller 72 determines that at least one of the posture of the body 30 of the human-powered vehicle 10 and the posture of the rider is in the predetermined state, for example, in a case where the length of the rear suspension device is greater than or equal to a predetermined length.

In the sixth example, the state detector 84 is configured to detect, for example, at least one of internal pressure of the suspension device 88, spring load of the suspension device 88, and a pressure state of a spring contact portion of the suspension device 88 received from the spring.

In the present embodiment, for example, as described in the first to sixth examples, in a case where the human-powered vehicle 10 is in an unstable traveling state, the driving of the transmission body 20 with the motor 24 is reduced. Thus, the rider is less likely to feel awkward.

In a case where at least one of the posture of the body 30 of the human-powered vehicle 10 and the posture of the rider exits the predetermined state, the electronic controller 72 shifts the control state to the first control state.

The electronic controller 72 can be configured to shift the control state to the second control state in a case where the rider is riding the human-powered vehicle 10 and at least one of the posture of the body 30 of the human-powered vehicle 10 and the posture of the rider is in the predetermined state, and after shifting the control state to the second control state, shift the control state to the first control state in a case where a state in which load on the rider is greater than a first load continues over a first period or longer. The electronic controller 72 can be configured to determine the load on the rider based on human driving force H, the gradient of the road on which the human-powered vehicle 10 is traveling, or traveling resistance. Even in a case where the human-powered vehicle 10 is in an unstable traveling state, if the load on the rider is large and a shifting action (especially, downshift) is desirable, the driving of the transmission body 20 with the motor 24 can be permitted to reduce the load on the rider. An example of the state where the human-powered vehicle 10 is in an unstable traveling state and the load on the rider is large is a case where the rider is in a standing pedaling state and the human-powered vehicle 10 is traveling uphill.

Preferably, the human-powered vehicle control device 70 includes a load detector 90. The load detector 90 includes, for example, the human driving force detector 82. The load detector 90 can include at least one of an inclination detector and a traveling resistance detector instead of or in addition to the human driving force detector 82.

Figure 7:
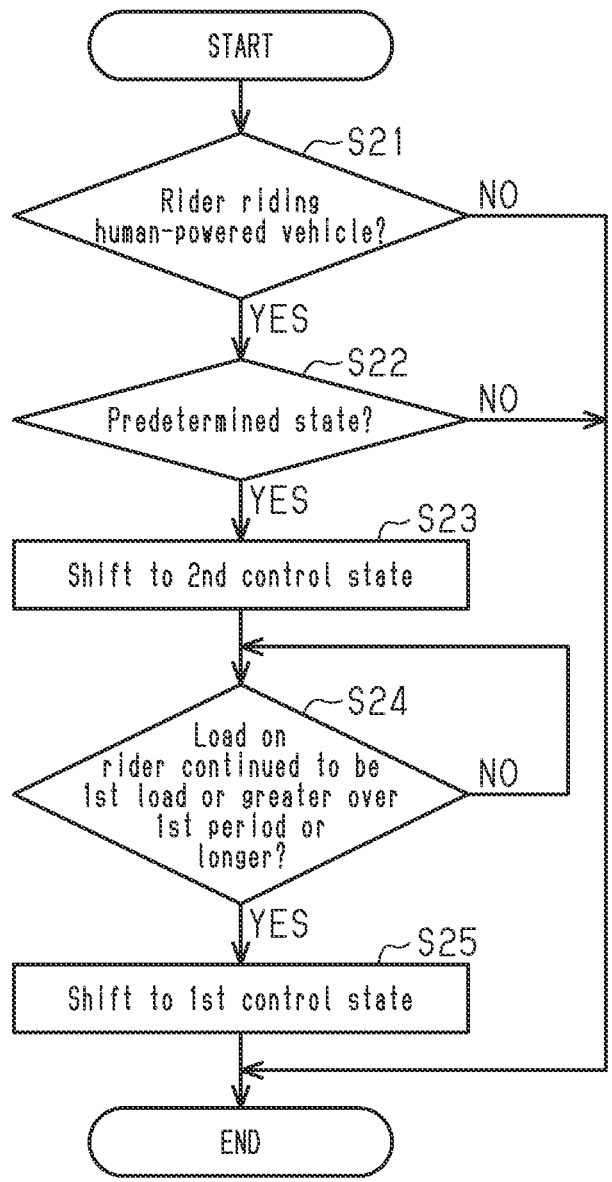
FIG. 7 is a flowchart of a process for changing the control state executed by the electronic controller shown in FIG. 6.

With reference to FIG. 7, a process for shifting the control state of the motor 24 by the electronic controller 72 will now be described. In a case where electric power is supplied to, for example, the electronic controller 72, the electronic controller 72 starts the process and proceeds to step S21 of the flowchart shown in FIG. 7. In a case where the flowchart shown in FIG. 7 ends, the electronic controller 72 repeats the process from step S21 after a predetermined interval, for example, until the supply of electric power stops.

In step S21, the electronic controller 72 determines whether a rider is riding the human-powered vehicle 10. In a case where the rider is not riding the human-powered vehicle 10, the electronic controller 72 ends the process. In a case where the rider is riding the human-powered vehicle 10, the electronic controller 72 proceeds to step S22.

In step S22, the electronic controller 72 determines whether at least one of the posture of the body 30 of the human-powered vehicle 10 and the posture of the rider is in the predetermined state. In a case where the predetermined state is not satisfied, the electronic controller 72 ends the process. In a case where at least one of the posture of the body 30 of the human-powered vehicle 10 and the posture of the rider is in the predetermined state, the electronic controller 72 proceeds to step S23.

In step S23, the electronic controller 72 shifts the control state to the second control state and proceeds to step S24.

In step S24, the electronic controller 72 determines whether a state in which load on the rider is greater than the first load has continued over the first period or longer. In a case where the state in which load on the rider is greater than the first load has not continued over the first period or longer, the electronic controller 72 again executes step S24. In a case where the state in which load on the rider is greater than the first load has continued over the first period or longer, the electronic controller 72 proceeds to step S25.

In step S25, the electronic controller 72 shifts the control state to the first control state and ends the process.

Third Embodiment

A third embodiment of the human-powered vehicle control device 70 will now be described with reference to FIGS. 6 and 7. The human-powered vehicle control device 70 of the third embodiment is the same as the human-powered vehicle control device 70 of the second embodiment except that the predetermined state includes a case where a steering angle of the handlebar 42 of the human-powered vehicle 10 is outside a predetermined angular range. In the human-powered vehicle control device 70 of the third embodiment, same reference characters are given to those elements that are the same as the corresponding elements in the first and second embodiments. Such elements will not be described in detail.

In the present embodiment, the predetermined state includes a seventh example. In the present embodiment, the predetermined state can include at least one of the first example, the second example, the third example, the fourth example, the fifth example, and the sixth example in addition to the seventh example.

In the seventh example, the predetermined state includes a case where the steering angle of the handlebar 42 of the human-powered vehicle 10 is outside the predetermined angular range. The electronic controller 72 determines that at least one of the posture of the body 30 of the human-powered vehicle 10 and the posture of the rider is in the predetermined state, for example, in a case where the steering angle of the handlebar 42 is outside the predetermined angular range. The predetermined angular range includes an angle corresponding to a direction in which the frame 32 of the human-powered vehicle 10 extends. The steering angle of the handlebar 42 is defined as zero degrees in the direction in which the frame 32 extends. The predetermined angular range includes, for example, a range from a first angle to a second angle. The first angle is a positive angle. The second angle is a negative angle. The predetermined angular range includes, for example, a range from +30 degrees to −30 degrees. The predetermined angular range includes, for example, a range from +20 degrees to −20 degrees. The predetermined angular range includes, for example, a range from +10 degrees to −10 degrees.

In the seventh example, the state detector 84 is configured to detect, for example, a rotational angle of the front fork 38 with respect to a head tube of the frame 32 as the steering angle of the handlebar 42.

The electronic controller 72 executes, for example, the same process as in the flowchart of the second embodiment shown in FIG. 7. For example, in step S22, the electronic controller 72 determines whether the steering angle of the handlebar 42 of the human-powered vehicle 10 is outside the predetermined angular range. In a case where the steering angle of the handlebar 42 of the human-powered vehicle 10 is outside the predetermined angular range, the electronic controller 72 proceeds to step S23. In a case where the steering angle of the handlebar 42 of the human-powered vehicle 10 is not outside the predetermined angular range, the electronic controller 72 ends the process.

Fourth Embodiment

Figure 4:
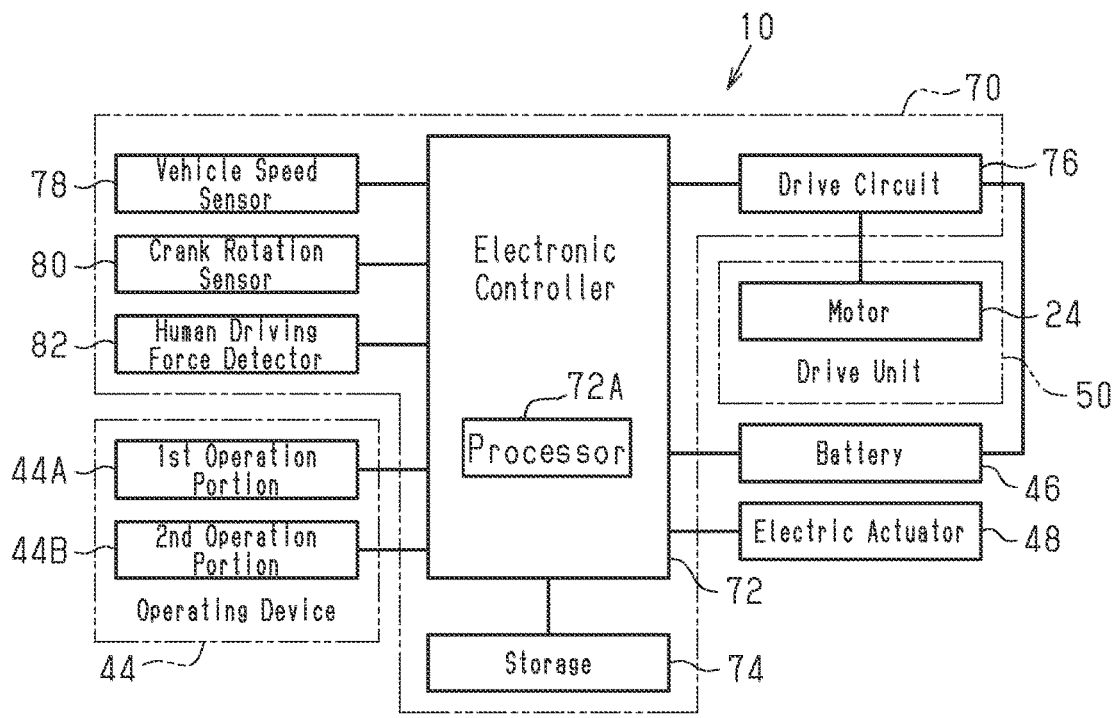
FIG. 4 is a block diagram showing the electrical configuration of the human-powered vehicle including the human-powered vehicle control device of the first embodiment.

A fourth embodiment of the human-powered vehicle control device 70 will now be described with reference to FIGS. 4 and 8. The human-powered vehicle control device 70 of the fourth embodiment is the same as the human-powered vehicle control device 70 of the first embodiment except that the electronic controller 72 executes the process of the flowchart shown in FIG. 8 instead of the process of the flowchart shown in FIG. 5. In the human-powered vehicle control device 70 of the fourth embodiment, same reference characters are given to those elements that are the same as the corresponding elements in the first embodiment. Such elements will not be described in detail.

The electronic controller 72 shifts the control state to the first control state in a case where the parameter P related to the human driving force H is greater than or equal to the first value P1 and shifts the control state to the second control state in a case where the parameter P related to the human driving force H is less than or equal to a second value P2. The first value P1 is greater than the second value P2. The second value P2 is set to a value that can determine, for example, a state in which the wheel 16 is separated from ground and an operator of the human-powered vehicle 10 puts his or her hand on the pedals 34 and rotates the crank axle 12 for maintenance or the like. Preferably, the second value P2 is less than or equal to 10 Nm. Preferably, the second value P2 is less than or equal to 5 Nm. Preferably, the second value P2 is greater than or equal to 1 Nm. The first value P1 is the same as that of the first embodiment.

Preferably, in a case where the parameter P related to the human driving force H is greater than the second value P2 and less than the first value P1, that is, in a case where shifting of the control state cannot be determined based on the condition of human driving force H, the electronic controller 72 shifts the control state to the first control state in a case where the rotational speed C of the crank axle 12 is greater than or equal to a first rotational speed CX.

In the present embodiment, the control state is appropriately shifted to the first control state or the second control state based on the value of the human driving force H.

Figure 8:
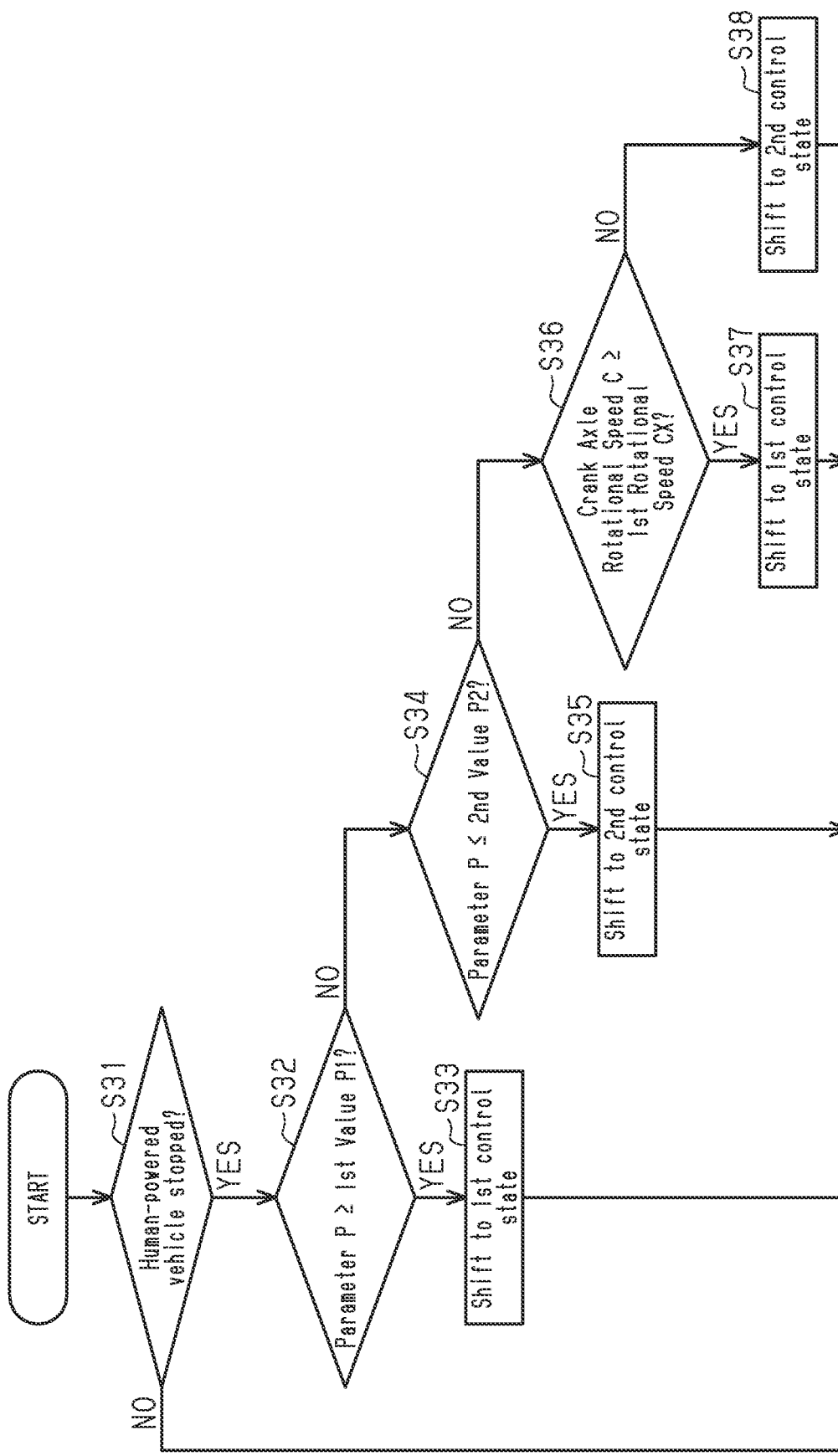
FIG. 8 is a flowchart of a process for changing the control state executed by an electronic controller in accordance with a fourth embodiment.

With reference to FIG. 8, a process for shifting the control state of the motor 24 by the electronic controller 72 will now be described. For example, in a case where electric power is supplied to the electronic controller 72, the electronic controller 72 starts the process and proceeds to step S31 of the flowchart shown in FIG. 8. In a case where the flowchart shown in FIG. 8 ends, the electronic controller 72 repeats the process from step S31 after a predetermined interval, for example, until the supply of electric power stops.

In step S31, the electronic controller 72 determines whether the human-powered vehicle 10 is stopped. In a case where the human-powered vehicle 10 is not stopped, the electronic controller 72 ends the process. Step S31 can be omitted. In a case where the human-powered vehicle 10 is stopped, the electronic controller 72 proceeds to step S32.

In step S32, the electronic controller 72 determines whether the parameter P is greater than or equal to the first value P1. In a case where the parameter P is greater than or equal to the first value P1, the electronic controller 72 proceeds to step S33. In a case where the parameter P is not greater than or equal to the first value P1, the electronic controller 72 proceeds to step S34.

In step S33, the electronic controller 72 shifts the control state to the first control state and ends the process. In a case where the control state is the first control state, the electronic controller 72 maintains the first control state.

In step S34, the electronic controller 72 determines whether the parameter P is less than or equal to the second value P2. In a case where the parameter P is less than or equal to the second value P2, the electronic controller 72 proceeds to step S35. In a case where the parameter P is not less than or equal to the second value P2, the electronic controller 72 proceeds to step S36.

In step S35, the electronic controller 72 shifts the control state to the second control state and ends the process. In a case where the control state is the second control state, the electronic controller 72 maintains the second control state.

In step S36, the electronic controller 72 determines whether the rotational speed C of the crank axle 12 is greater than or equal to the first rotational speed CX. In a case where the rotational speed C of the crank axle 12 is greater than or equal to the first rotational speed CX, the electronic controller 72 proceeds to step S37. In a case where the rotational speed C of the crank axle 12 is not greater than or equal to the first rotational speed CX, the electronic controller 72 proceeds to step S38.

In step S37, the electronic controller 72 shifts the control state to the first control state and ends the process. In a case where the control state is the first control state, the electronic controller 72 maintains the first control state.

In step S38, the electronic controller 72 shifts the control state to the second control state and ends the process. In a case where the control state is the second control state, the electronic controller 72 maintains the second control state.

Fifth Embodiment

A fifth embodiment of the human-powered vehicle control device 70 will now be described with reference to FIGS. 4 and 9. The human-powered vehicle control device 70 of the fifth embodiment is the same as the human-powered vehicle control device 70 of the first embodiment except that the electronic controller 72 executes the process of the flowchart shown in FIG. 9 instead of the process of the flowchart shown in FIG. 5. In the human-powered vehicle control device 70 of the fifth embodiment, same reference characters are given to those elements that are the same as the corresponding elements in the first embodiment. Such elements will not be described in detail.

The electronic controller 72 is configured to enable of an operator of the human-powered vehicle 10 to select the first control state or the second control state. The operator includes, for example, a rider of the human-powered vehicle 10 in a case where the human-powered vehicle 10 is traveling. The operator includes, for example, a rider who is riding the human-powered vehicle 10. The operator includes, for example, a rider of the human-powered vehicle 10 and a mechanic in a case where the human-powered vehicle 10 is stopped or is under maintenance.

Preferably, in a case where the human-powered vehicle 10 is stopped, the electronic controller 72 is configured to enable the operator of the human-powered vehicle 10 to select the first control state or the second control state. For example, in a case where the human-powered vehicle 10 is stopped and the operator performs an operation for permitting the shifting action on an operation portion provided on the human-powered vehicle 10, the electronic controller 72 selects the first control state or the second control state. The electronic controller 72 can be configured to show information for prompting selection on a display provided on the human-powered vehicle 10 in a case where the human-powered vehicle 10 is stopped.

Preferably, the electronic controller 72 shifts the control state to the second control state in a case where the operator of the human-powered vehicle 10 does not perform an operation for selecting the first control state and the human-powered vehicle 10 is stopped.

In the present embodiment, the first control state can be selected in accordance with determination of the operator. Thus, usability is improved.

Figure 9:
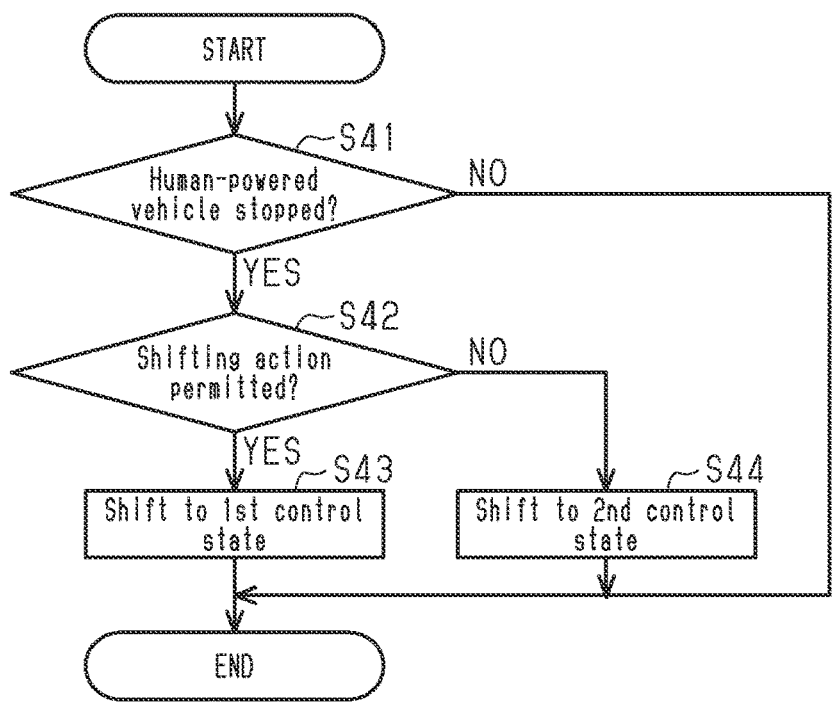
FIG. 9 is a flowchart of a process for changing the control state executed by an electronic controller in accordance with a fifth embodiment.

With reference to FIG. 9, a process for shifting the control state of the motor 24 by the electronic controller 72 will now be described. For example, in a case where electric power is supplied to the electronic controller 72, the electronic controller 72 starts the process and proceeds to step S41 of the flowchart shown in FIG. 9. In a case where the flowchart shown in FIG. 9 ends, the electronic controller 72 repeats the process from step S41 after a predetermined interval, for example, until the supply of electric power stops.

In step S41, the electronic controller 72 determines whether the human-powered vehicle 10 is stopped. In a case where the human-powered vehicle 10 is not stopped, the electronic controller 72 ends the process. In a case where the human-powered vehicle 10 is stopped, the electronic controller 72 proceeds to step S32.

In step S42, the electronic controller 72 determines whether to permit the shifting action. The electronic controller 72 determines to permit the shifting action, for example, in a case where the operator of the human-powered vehicle 10 performs an operation for selecting the first control state. In a case where the shifting action is permitted, the electronic controller 72 proceeds to step S43. In a case where the shifting action is not permitted, the electronic controller 72 proceeds to step S44.

In step S43, the electronic controller 72 shifts the control state to the first control state and ends the process.

In step S44, the electronic controller 72 shifts the control state to the second control state and ends the process.

Sixth Embodiment

Figure 10:
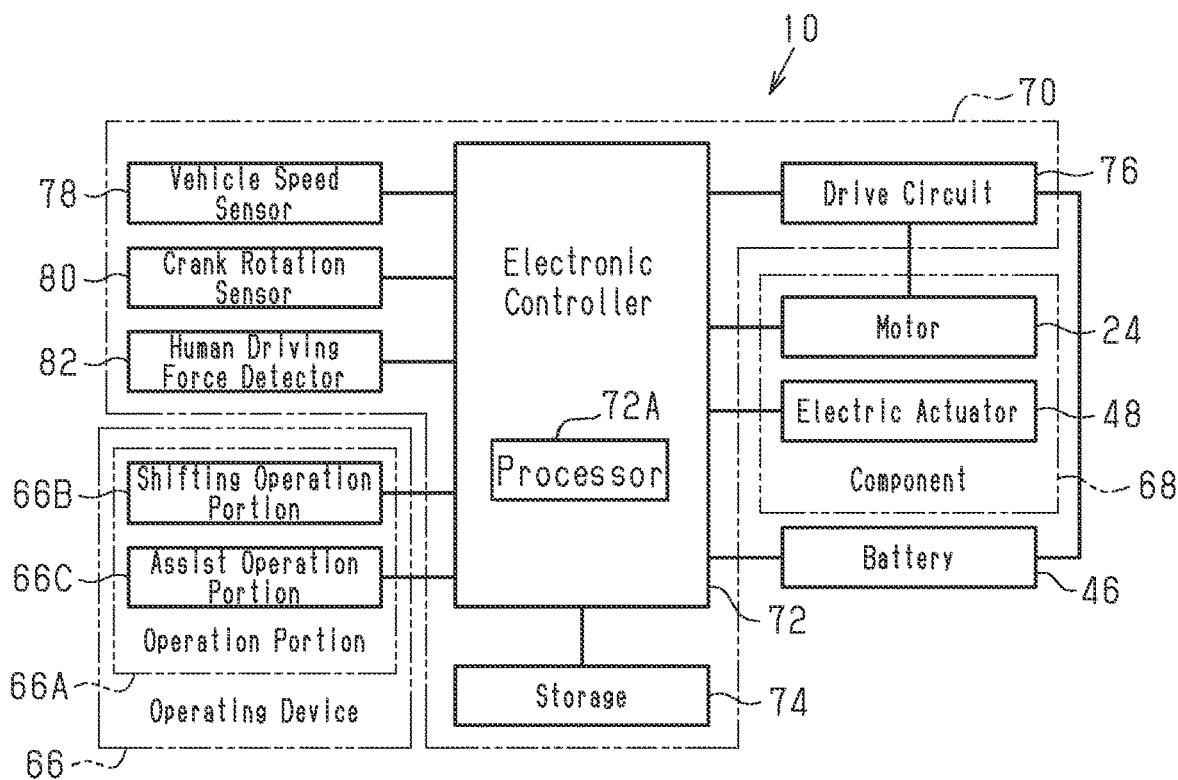
FIG. 10 is a block diagram showing the electrical configuration of a human-powered vehicle including a human-powered vehicle control device for a human-powered vehicle in accordance with a sixth embodiment.

A sixth embodiment of the human-powered vehicle control device 70 will now be described with reference to FIGS. 10 and 11. The human-powered vehicle control device 70 of the sixth embodiment is the same as the human-powered vehicle control device 70 of the first embodiment except that the electronic controller 72 executes the process of the flowchart shown in FIG. 11 instead of the process of the flowchart shown in FIG. 5. In the human-powered vehicle control device 70 of the sixth embodiment, same reference characters are given to those elements that are the same as the corresponding elements in the first embodiment. Such elements will not be described in detail.

In the present embodiment, the human-powered vehicle 10 further includes an operating device 66. The electronic controller 72 is configured to enable the operator to select the first control state or the second control state by operating the operating device 66.

For example, the operating device 66 includes an operation portion 66A that is operated by the operator and undergoes a first operation and a second operation that differs from the first operation. For example, in a case where the first operation is performed on the operation portion 66A, the electronic controller 72 controls a component 68 of the human-powered vehicle 10. The electronic controller 72 is configured to shift the control state to the first control state in a case where the second operation is performed on the operation portion 66A.

For example, the component 68 includes the derailleur 22, and the operation portion 66A includes a shifting operation portion 66B configured to operate the derailleur 22. In a case where the component 68 includes the derailleur 22, the electronic controller 72 is configured to control the derailleur 22 in a case where the first operation is performed on the shifting operation portion 66B. The shifting operation portion 66B can separately include a shifting operation portion 66B for increasing the transmission ratio R and a shifting operation portion 66B for decreasing the transmission ratio R.

For example, the component 68 includes the motor 24, and the operation portion 66A includes an assist operation portion 66C configured to change the assist level A of the motor 24. In a case where the component 68 includes the motor 24, the electronic controller 72 is configured to change the assist level A in a case where the first operation is performed on the assist operation portion 66C. An assist operation portion 66C for increasing the assist level A and an assist operation portion 66C for decreasing the assist level A can be separately provided.

For example, the second operation is an operation in which the operation portion 66A is continuously operated over a first time or longer. For example, the first time is two seconds or longer and four seconds or shorter. The second operation can be an operation in which the operation portion 66A is operated a predetermined number of times or more during a second time. In a case where the second operation is the operation in which the operation portion 66A is operated the predetermined number of times or more during the second time, at least one of the predetermined number of operations can include a long-press operation of the operation portion 66A. The operation time of the second operation and the number of times that the second operation is operated can be set or changed by the operator. For example, the operator can use an external device to access the human-powered vehicle control device 70 through wired or wireless communication and change setting information stored in the storage 74 in accordance with preferences. The external device includes, for example, a personal computer, a tablet computer, a smartphone, or a cycle computer. For example, the operator can use a program stored in the external device to change setting information stored in the storage 74 in accordance with preferences.

For example, the electronic controller 72 controls the derailleur 22 to perform the shifting action for a single stage or multiple stages in a case where a third operation is performed on the operation portion 66A after the second operation. In a case where the electronic controller 72 controls the derailleur 22 to perform the shifting action for a single stage, the transmission ratio R is changed by one stage. In a case where the electronic controller 72 controls the derailleur 22 to perform the shifting action for multiple stages, the transmission ratio R is changed by multiple stages. The operation for specifying the number of stages of the shifting action can be set or changed by the operator in the same manner as the operation time of the second operation and the number of times that the second operation is operated. For example, the operator can use the external device to change setting information related to the operation that specifies the number of stages of the shifting action in accordance with preferences.

For example, the third operation is performed after the second operation in which the operation portion 66A is continuously operated over a third time or longer and is an operation in which the operation portion 66A is further continuously operated over a fourth time or longer. For example, the third time is shorter than the fourth time. The third time can be longer than the fourth time. The third time can be equal to the fourth time. For example, the third time is two seconds or longer and four seconds or shorter. The fourth time is one second or longer and three seconds or shorter. For example, in a case where the operation portion 66A is operated for three seconds in the second operation, the control state is shifted to the first control state. Then, in the third operation following the second operation, in a case where the operation portion 66A is operated for one second, two seconds, and three seconds, the shifting action is performed for one stage, two stages, and three stages, respectively.

For example, the third operation can be performed after the second operation is performed on the operation portion 66A and is an operation in which the operation portion 66A is temporarily released and then operated again within a predetermined time. For example, in a case where the operation portion 66A is operated for three seconds in the second operation, the control state is shifted to the first control state. Then, in a case where the operation portion 66A is temporarily released and then operated once, twice, and three times in the third operation, the shifting action is performed for one stage, two stages, and three stages, respectively.

For example, the electronic controller 72 is configured to shift the control state from the first control state to the second control state in a case where a fourth operation is performed on the operation portion 66A after the second operation. For example, the electronic controller 72 is configured to shift the control state from the first control state to the second control state in a case where the fourth operation is performed on the operation portion 66A after the third operation. For example, the electronic controller 72 is configured to shift the control state from the first control state to the second control state in a case where the fourth operation is performed on the operation portion 66A after the third operation that is performed after the second operation. The electronic controller 72 can be configured to shift the control state from the first control state to the second control state in a case where the fourth operation is performed after the second operation without the third operation being performed. The electronic controller 72 can be configured to shift the control state from the first control state to the second control state in a case where neither the third operation nor the fourth operation is performed after the second operation and a predetermined time has elapsed.

In the present embodiment, the control state can be shifted by operation of the operator. Thus, usability is improved.

Figure 11:
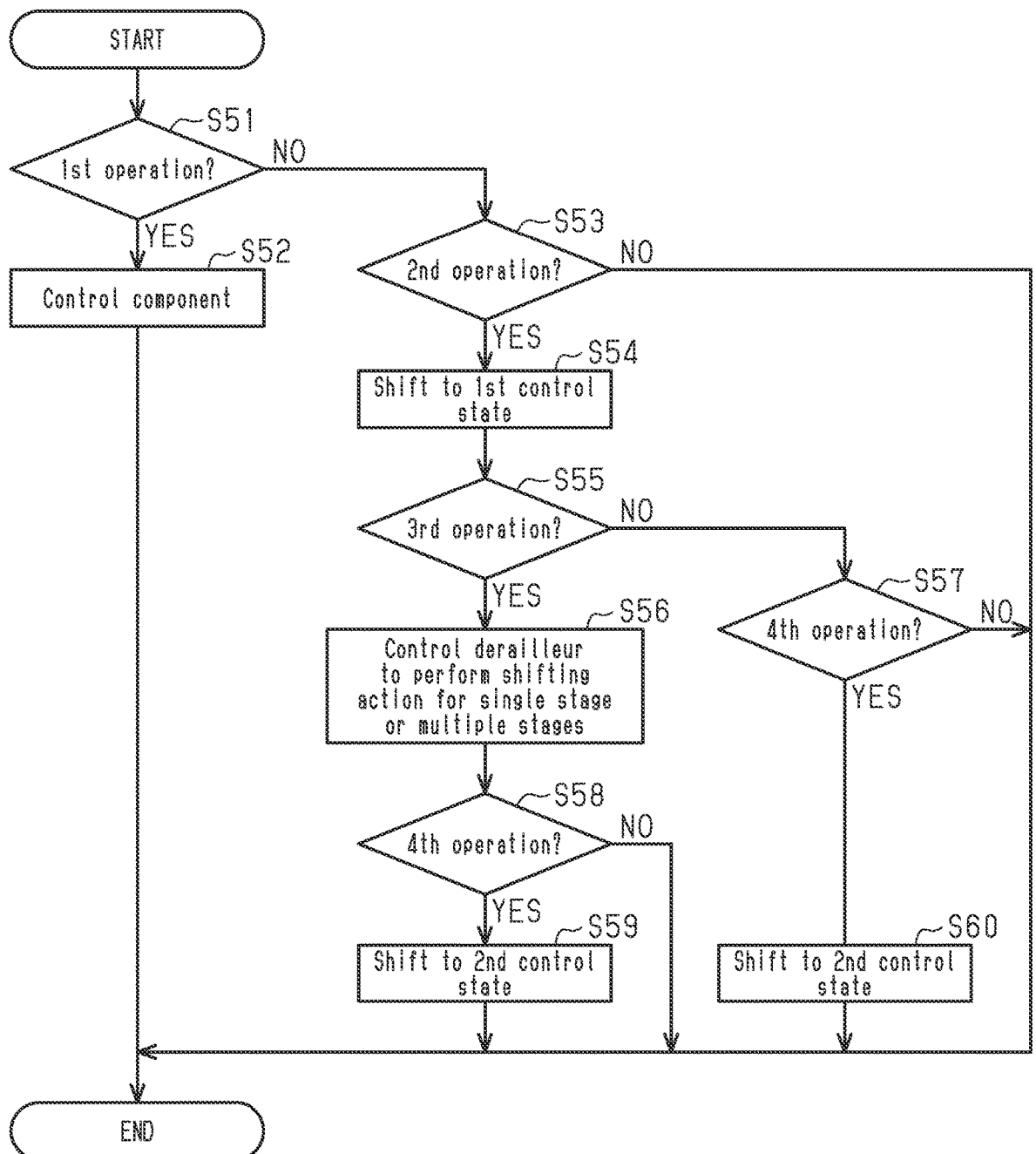
FIG. 11 is a flowchart of a process for changing the control state executed by the electronic controller shown in FIG. 10.

With reference to FIG. 11, a process for shifting the control state of the motor 24 by the electronic controller 72 will now be described. For example, in a case where electric power is supplied to the electronic controller 72, the electronic controller 72 starts the process and proceeds to step S51 of the flowchart shown in FIG. 11. In a case where the flowchart shown in FIG. 11 ends, the electronic controller 72 repeats the process from step S51 after a predetermined interval, for example, until the supply of electric power stops.

In step S51, the electronic controller 72 determines whether the first operation is performed on the operation portion 66A. In a case where the first operation is performed on the operation portion 66A, the electronic controller 72 proceeds to step S52. In a case where the first operation is not performed on the operation portion 66A, the electronic controller 72 proceeds to step S53.

In step S52, the electronic controller 72 controls the component 68 and ends the process. In step S52, in a case where the component 68 includes the derailleur 22, the electronic controller 72 controls the derailleur 22. For example, in step S51, in a case where the first operation for increasing the transmission ratio R is performed on the shifting operation portion 66B, in step S52, the electronic controller 72 controls the derailleur 22 to increase the transmission ratio R. For example, in step S51, in a case where the first operation for decreasing the transmission ratio R is performed on the shifting operation portion 66B, in step S52, the electronic controller 72 controls the derailleur 22 to decrease the transmission ratio R. In step S52, in a case where the component 68 includes the motor 24, the electronic controller 72 changes the assist level A. For example, in step S51, in a case where the first operation for increasing the assist level A is performed on the assist operation portion 66C, in step S52, the electronic controller 72 increases the assist level A. For example, in step S51, in a case where the first operation for decreasing the assist level A is performed on the assist operation portion 66C, in step S52, the electronic controller 72 decreases the assist level A.

In step S53, the electronic controller 72 determines whether the second operation is performed on the operation portion 66A. In a case where the second operation is performed on the operation portion 66A, the electronic controller 72 proceeds to step S54. In a case where the second operation is not performed on the operation portion 66A, the electronic controller 72 ends the process.

In step S54, the electronic controller 72 shifts the control state to the first control state and then proceeds to step S55.

In step S55, the electronic controller 72 determines whether the third operation is performed on the operation portion 66A. In a case where the third operation is performed on the operation portion 66A, the electronic controller 72 proceeds to step S56. In a case where the third operation is not performed on the operation portion 66A, the electronic controller 72 proceeds to step S57.

In step S56, the electronic controller 72 controls the derailleur 22 to perform the shifting action for a single stage or multiple stages and then proceeds to step S58.

In step S58, the electronic controller 72 determines whether the fourth operation is performed on the operation portion 66A. In a case where the fourth operation is performed on the operation portion 66A, the electronic controller 72 proceeds to step S59. In a case where the third operation is not performed on the operation portion 66A, the electronic controller 72 ends the process.

In step S59, the electronic controller 72 shifts the control state to the second control state and then ends the process.

In step S57, the electronic controller 72 determines whether the fourth operation is performed on the operation portion 66A. In a case where the fourth operation is performed on the operation portion 66A, the electronic controller 72 proceeds to step S60. In a case where the fourth operation is not performed on the operation portion 66A, the electronic controller 72 ends the process.

In step S60, the electronic controller 72 shifts the control state to the second control state and then ends the process.

Seventh Embodiment

Figure 12:
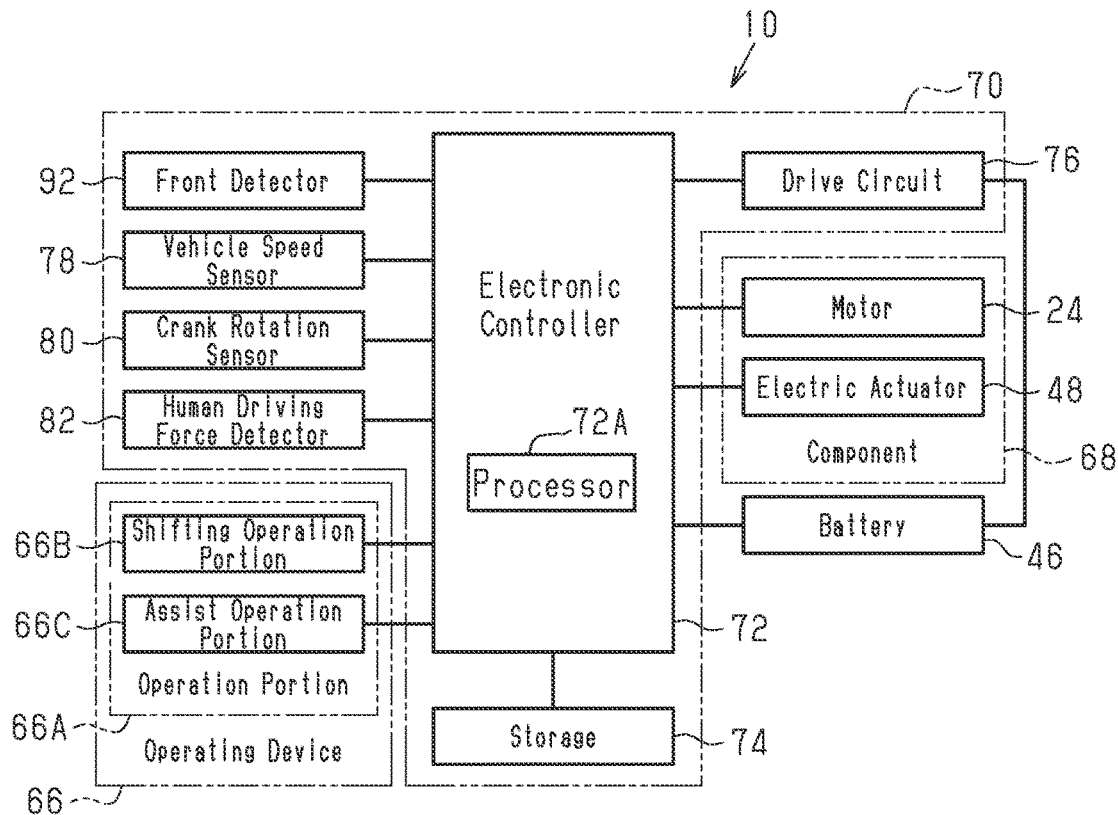
FIG. 12 is a block diagram showing the electrical configuration of a human-powered vehicle including a human-powered vehicle control device for a human-powered vehicle in accordance with a seventh embodiment.

A seventh embodiment of the human-powered vehicle control device 70 will now be described with reference to FIGS. 12 and 13. The human-powered vehicle control device 70 of the seventh embodiment is the same as the human-powered vehicle control device 70 of the first embodiment except that the electronic controller 72 executes the process of the flowchart shown in FIG. 13 instead of the process of the flowchart shown in FIG. 5. In the human-powered vehicle control device 70 of the seventh embodiment, same reference characters are given to those elements that are the same as the corresponding elements in the first embodiment. Such elements will not be described in detail.

In the present embodiment, the human-powered vehicle control device 70 further includes a front detector 92. The front detector 92 includes at least one of a GPS receiver, a camera, and an electromagnetic wave irradiator (e.g., laser imaging detection and ranging (LiDAR)). In a case where the front detector 92 includes a GPS receiver, the storage 74 has prestored map information including information related to road gradient. The electronic controller 72 predicts the gradient of road ahead based on information of the current position of the human-powered vehicle 10 and the prestored map information. In a case where the front detector 92 includes a camera, the electronic controller 72 detects a frontward condition based on an image captured by the camera. In a case where the front detector 92 includes an electromagnetic wave irradiator, the electronic controller 72 detects a frontward condition based on an object detected from a reflected wave of the electromagnetic wave.

The electronic controller 72 can include an artificial intelligence processor that outputs a frontward condition in accordance with an input from the front detector 92. The artificial intelligence processor includes, for example, a storage unit storing software and a processing unit executing the software stored in the storage unit. The processing unit includes, for example, a CPU or an MPU. Preferably, the processing unit includes a graphics processing unit (GPU) in addition to the CPU or MPU. The arithmetic processing unit can include a field-programmable gate array (FPGA). The artificial intelligence processor can include one or more processing units. The artificial intelligence processor can include processing units that are located at separate locations. The storage unit includes, for example, a nonvolatile memory and a volatile memory. The storage unit stores a control program, a learning program, and a learning model. The learning model can be a leaned model that is learned by a predetermined learning algorithm or can be configured to be updated by a learning algorithm. The learning algorithm includes machine learning, deep learning, or deep reinforcement learning. The learning algorithm includes, for example, at least one of supervised learning, unsupervised learning, and reinforcement learning. As long as the learning algorithm is configured to update the learning model through a process used in the field of artificial intelligence, a process other than those described in this specification can be used. Preferably, the learning process for updating the learning model is performed by the GPU. The learning algorithm can use a neural network (NN). The learning algorithm can use a recurrent neural network (RNN).

In the present embodiment, the electronic controller 72 shifts the control state to the second control state in a case where an uphill is detected ahead in a traveling direction of the human-powered vehicle 10 in a case where the human-powered vehicle 10 is accelerating or traveling downhill. For example, the electronic controller 72 further includes a third control state in which the shifting action is performed and which differs from the first control state. For example, the electronic controller 72 shifts the control state to the third control state after shifting to the second control state and before reaching the uphill. The shifting action performed during the third control state is a shift down. The shift down is a shifting action that decreases the transmission ratio R.

Preferably, in the third control state, the electronic controller 72 performs a shift down in the shifting action before reaching the uphill. The electronic controller 72 starts a shift down in correspondence with, for example, the relationship of the time taken for the shift down with at least one of the distance to the uphill and the vehicle speed V. For example, the electronic controller 72 starts a shift down before the time at which the uphill is reached, which is calculated from the distance to the uphill and the vehicle speed V, becomes less than the time taken for the shift down.

For example, in a case where the shifting action is performed in accordance with the vehicle speed V and human driving force H, a shift up is performed in a case where the human-powered vehicle 10 is accelerating or traveling downhill. However, in a case where there is an uphill ahead and a shift up is performed, the rider will feel the pedals are heavy after the human-powered vehicle 10 enters the uphill. To avoid this, in a case where an uphill is detected ahead, it is preferred that the shifting action is restricted or a shifting action for a shift down is performed to prepare for the uphill travelling.

In the present embodiment, the control state can be shifted by the frontward condition. Thus, usability is improved.

Figure 13:
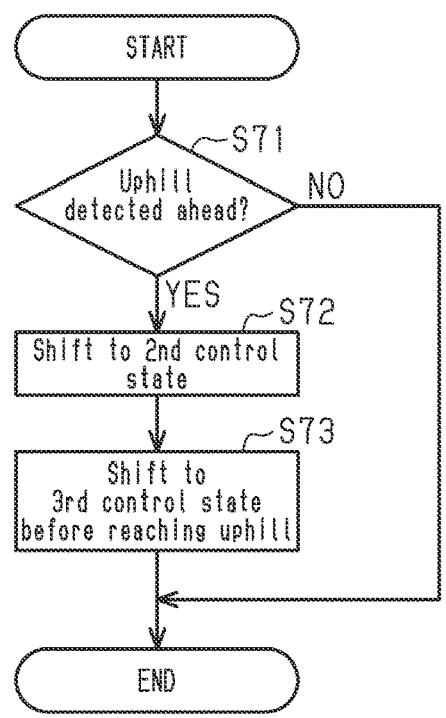
FIG. 13 is a flowchart of a process for changing the control state executed by an electronic controller in accordance with an eighth embodiment.

With reference to FIG. 13, a process for shifting the control state of the motor 24 by the electronic controller 72 will now be described. For example, in a case where electric power is supplied to the electronic controller 72, the electronic controller 72 starts the process and proceeds to step S71 of the flowchart shown in FIG. 13. In a case where the flowchart shown in FIG. 13 ends, the electronic controller 72 repeats the process from step S71 after a predetermined interval, for example, until the supply of electric power stops.

In step S71, the electronic controller 72 determines whether an uphill is detected ahead. In a case where an uphill is detected ahead, the electronic controller 72 proceeds to step S72. In a case where an uphill is not detected ahead, the electronic controller 72 ends the process.

In step S72, the electronic controller 72 shifts the control state to the second control state and then proceeds to step S73.

In step S73, the electronic controller 72 shifts the control state to the third control state before reaching the uphill and then ends the process.

Eighth Embodiment

An eighth embodiment of the human-powered vehicle control device 70 will now be described with reference to FIGS. 10 and 14. The human-powered vehicle control device 70 of the eighth embodiment is the same as the human-powered vehicle control device 70 of the seventh embodiment except that the electronic controller 72 executes the process of the flowchart shown in FIG. 14 instead of the process of the flowchart shown in FIG. 13. In the human-powered vehicle control device 70 of the eighth embodiment, same reference characters are given to those elements that are the same as the corresponding elements in the seventh embodiment. Such elements will not be described in detail. In the present embodiment, the front detector 92 can be omitted from the human-powered vehicle control device 70.

In the present embodiment, the electronic controller 72 is actuated in the control state including a fourth control state. In the fourth control state, the electronic controller 72 is configured to perform the shifting action in a case where the shifting operation portion 66B is operated. In the fourth control state, the electronic controller 72 is configured to drive the motor 24 to assist in walking the human-powered vehicle 10 in a case where the assist operation portion 66C is operated. That is, in the fourth control state, the operator operates the shifting operation portion 66B in a case where the shifting action is necessary, and operates the assist operation portion 66C in a case where the assistance in walking the human-powered vehicle 10 is necessary. In the fourth control state, the electronic controller 72 is configured to drive the motor 24 to assist in walking the human-powered vehicle 10 while the assist operation portion 66C continues to be operated.

For example, the electronic controller 72 is configured to shift the control state to the fourth control state in a case where the shifting operation portion 66B or the assist operation portion 66C is operated. The operation portion and the operation performed on the operation portion for shifting the control state to the fourth control state can be set or changed by the operator. For example, the operator can use the external device to access the human-powered vehicle control device 70 through wired or wireless communication and use a program stored in the external device to change setting information stored in the storage 74 in accordance with preferences. The electronic controller 72 can be configured to enter the fourth control state via an off mode in which the motor 24 does not assist in accordance with the human driving force H. The electronic controller 72 can be configured to enter the fourth control state in a case where an operation portion that is different from the shifting operation portion 66B and the assist operation portion 66C is operated.

The control state before entering the fourth control state includes a normal control state. In the normal control state, for example, in a case where the crank axle 12 is rotated, the electronic controller 72 is configured to perform shifting in accordance with operation of the shifting operation portion 66B, and control the motor 24 to change the assist level A in accordance with operation of the assist operation portion 66C.

For example, the electronic controller 72 is configured to shift the control state to the fourth control state in a case where the shifting operation portion 66B or the assist operation portion 66C is operated over a sixth time or longer. For example, the sixth time is two seconds or longer and four seconds or shorter. In the same manner as the sixth embodiment, the shifting action of the fourth control state can be set or changed in accordance with preferences of the operator.

For example, in the fourth control state, the electronic controller 72 cancels the fourth control state in a case where the shifting operation portion 66B or the assist operation portion 66C is operated over a seventh time or longer. For example, the sixth time is shorter than the seventh time. For example, the seventh time is one second or longer and three seconds or shorter. The sixth time can be longer than the seventh time. The electronic controller 72 can be configured to cancel the fourth control state in a case where a short press operation is performed on the assist operation portion 66C irrespective of the seventh time.

For example, in a case where the crank axle 12 rotates during a shifting action in the fourth control state, the electronic controller 72 continues the shifting action without any interruption until the shifting action is completed. For example, in the fourth control state, in a case where the rider starts a shifting action while walking the human-powered vehicle 10 and then rides the human-powered vehicle 10 to start traveling on the human-powered vehicle 10 before the shifting action is completed, it is preferred that the shifting action continues without any interruption. In the present embodiment, the shifting action can be performed even in a walk mode. Thus, usability is improved.

Figure 14:
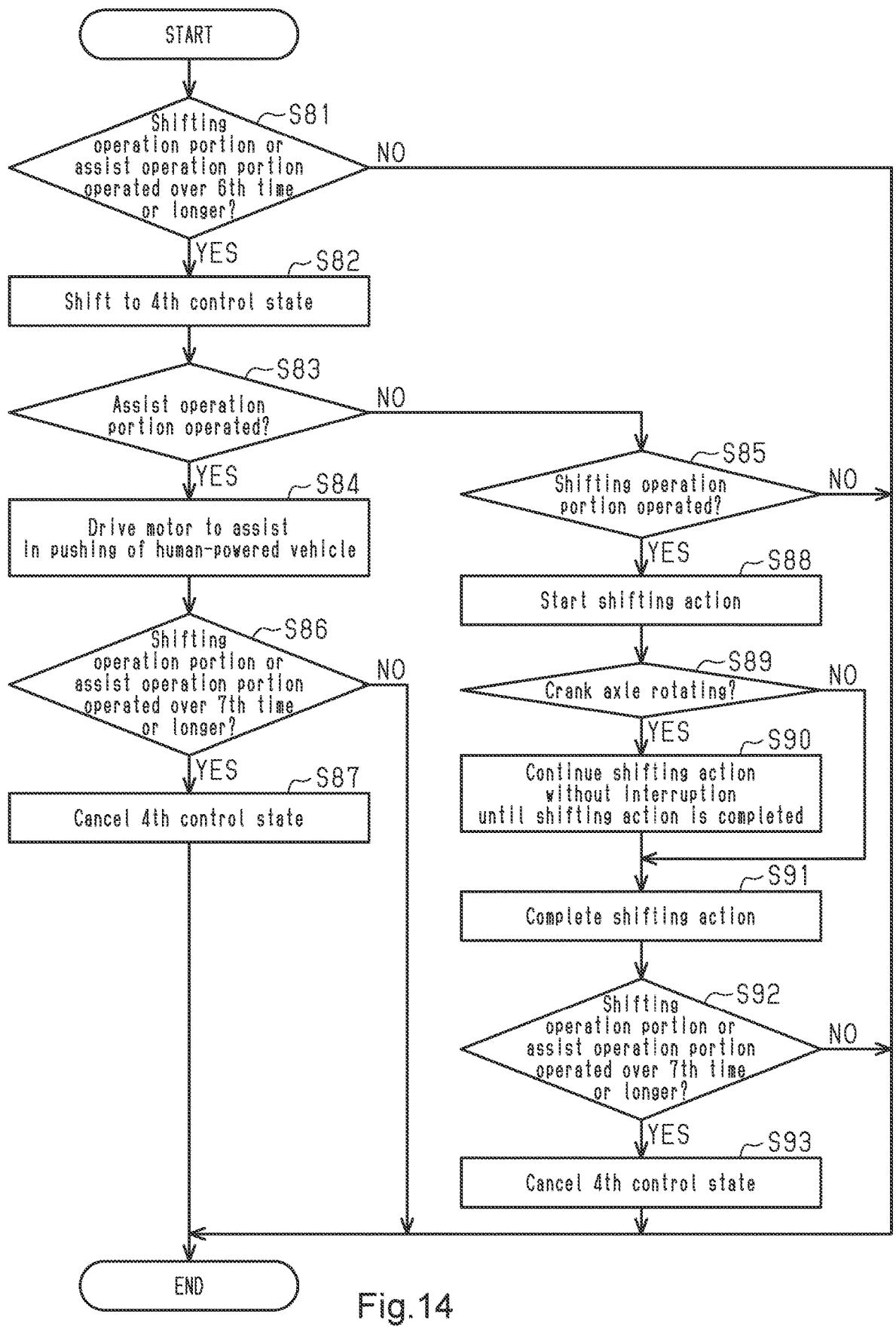
FIG. 14 is a flowchart of a process for changing the control state executed by an electronic controller in accordance with a ninth embodiment.

With reference to FIG. 14, a process for shifting the control state of the motor 24 by the electronic controller 72 will now be described. For example, in a case where electric power is supplied to the electronic controller 72, the electronic controller 72 starts the process and proceeds to step S81 of the flowchart shown in FIG. 14. In a case where the flowchart shown in FIG. 14 ends, the electronic controller 72 repeats the process from step S81 after a predetermined interval, for example, until the supply of electric power stops.

In step S81, the electronic controller 72 determines whether the shifting operation portion 66B or the assist operation portion 66C is operated over the sixth time or longer. In a case where the shifting operation portion 66B or the assist operation portion 66C is operated over the sixth time or longer, the electronic controller 72 proceeds to step S82. In a case where neither the shifting operation portion 66B nor the assist operation portion 66C is operated over the sixth time or longer, the electronic controller 72 ends the process.

In step S82, the electronic controller 72 shifts the control state to the fourth control state, and then proceeds to step S83. For example, in step S82, the electronic controller 72 shifts the control state from a fifth control state to the fourth control state.

In step S83, the electronic controller 72 determines whether the assist operation portion 66C is operated. In a case where the assist operation portion 66C is operated, the electronic controller 72 proceeds to step S84. In a case where the assist operation portion 66C is not operated, the electronic controller 72 proceeds to step S85.

In step S84, the electronic controller 72 drives the motor 24 to assist in walking the human-powered vehicle 10 and the proceeds to step S86.

In step S86, the electronic controller 72 determines whether the shifting operation portion 66B or the assist operation portion 66C is operated over the seventh time or longer. In a case where the shifting operation portion 66B or the assist operation portion 66C is operated over the seventh time or longer, the electronic controller 72 proceeds to step S87. In a case where neither the shifting operation portion 66B nor the assist operation portion 66C is operated over the seventh time or longer, the electronic controller 72 ends the process.

In step S87, the electronic controller 72 cancels the fourth control state and ends the process. For example, in step S87, the electronic controller 72 shifts the control state from the fourth control state to the fifth control state.

In step S85, the electronic controller 72 determines whether the shifting operation portion 66B is operated. In a case where the shifting operation portion 66B is operated, the electronic controller 72 proceeds to step S88. In a case where the shifting operation portion 66B is not operated, the electronic controller 72 ends the process.

In step S88, the electronic controller 72 starts a shifting action and then proceeds to step S86. Preferably, in step S88, the electronic controller 72 drives the transmission body 20 with the motor 24 to start the shifting action.

In step S89, the electronic controller 72 determines whether the crank axle 12 is rotating. In a case where the crank axle 12 is rotating, the electronic controller 72 proceeds to step S90. In a case where the crank axle 12 is not rotating, the electronic controller 72 proceeds to step S91.

In step S90, the electronic controller 72 continues the shifting action without any interruption until the shifting action is completed and then proceeds to step S91.

In step S91, the electronic controller 72 completes the shifting action and then proceeds to step S92.

In step S92, the electronic controller 72 determines whether the shifting operation portion 66B or the assist operation portion 66C is operated over the seventh time or longer. In a case where the shifting operation portion 66B or the assist operation portion 66C is operated over the seventh time or longer, the electronic controller 72 proceeds to step S93. In a case where neither the shifting operation portion 66B nor the assist operation portion 66C is operated over the seventh time or longer, the electronic controller 72 ends the process.

In step S93, the electronic controller 72 cancels the fourth control state and ends the process. For example, in step S93, the electronic controller 72 shifts the control state from the fourth control state to the fifth control state.

Modifications

The description related to the above embodiments exemplifies, without any intention to limit, applicable forms of a human-powered vehicle control device according to the present disclosure. The human-powered vehicle control device according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiment. Such elements will not be described in detail.

The parameter P related to the human driving force H can include a first human driving force H1 received from the first pedal 34A, and a second human driving force H2 received from the second pedal 34B. The electronic controller 72 can be configured to shift the control state to the second control state in a case where one of the first human driving force H1 and the second human driving force H2 is less than or equal to a third value P3 and the other one of the first human driving force H1 and the second human driving force H2 is less than or equal to a fourth value P4 that is less than the third value P3. The third value P3 is set to a value that can determine, for example, a state in which the wheel 16 is separated from ground and an operator of the human-powered vehicle 10 puts his or her hand on one of the pedals 34 and rotates the crank axle 12 for maintenance or the like. The third value P3 is greater than 0 Nm. Preferably, the third value P3 is less than or equal to 10 Nm. Preferably, the third value P3 is less than or equal to 5 Nm. Preferably, the third value P3 is greater than or equal to 1 Nm. Preferably, the fourth value P4 is less than or equal to 2 Nm. Preferably, the fourth value P4 is less than or equal to 1 Nm. Preferably, the fourth value P4 is greater than or equal to 0 Nm. To detect the first human driving force H1 and the second human driving force H2, each of the first pedal 34A and the second pedal 34B can be provided with a torque sensor. Alternatively, the crank 28 can be provided with a torque sensor to detect strain distribution. In a case where human driving force H cannot be detected from one of the pedals 34 due to a failure of the torque sensor, the control state can be erroneously shifted to the second control state. Therefore, it is desirable that verification is made based on the rotational speed C of the crank axle 12. For example, a step can be added to determine whether the rotational speed C is less than the first rotational speed CX.

In this modification, it is determined that one of the pedals 34 is rotated. Thus, as compared to the third embodiment, the circumstances such as maintenance is easily determined, and the control state is further appropriately shifted to the second control state.

Figure 15:
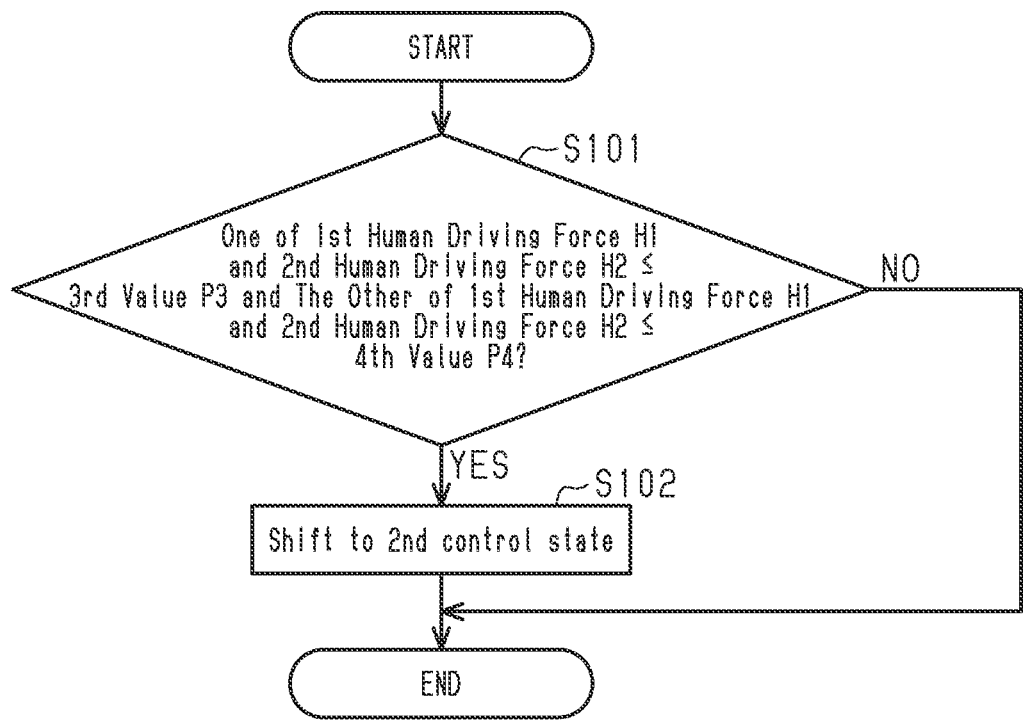
FIG. 15 is a flowchart of a process for changing the control state executed by an electronic controller in accordance with a first modified example.

With reference to FIG. 15, a process for shifting the control state of the motor 24 by the electronic controller 72 will now be described. For example, in a case where electric power is supplied to the electronic controller 72, the electronic controller 72 starts the process and proceeds to step S101 of the flowchart shown in FIG. 15. In a case where the flowchart shown in FIG. 15 ends, the electronic controller 72 repeats the process from step S101 after a predetermined interval, for example, until the supply of electric power stops.

In step S101, the electronic controller 72 determines whether one of the first human driving force H1 and the second human driving force H2 is less than or equal to the third value P3 and the other one of the first human driving force H1 and the second human driving force H2 is less than or equal to the fourth value P4, which is less than the third value P3.

In a case where one of the first human driving force H1 and the second human driving force H2 is not less than or equal to the third value P3 or the other one of the first human driving force H1 and the second human driving force H2 is not less than or equal to the fourth value P4, which is less than the third value P3, the electronic controller 72 ends the process. In a case where one of the first human driving force H1 and the second human driving force H2 is less than or equal to the third value P3 and the other one of the first human driving force H1 and the second human driving force H2 is less than or equal to the fourth value P4, which is less than the third value P3, the electronic controller 72 proceeds to step S52. Preferably, in step S101, in a case where one of the first human driving force H1 and the second human driving force H2 is less than or equal to the third value P3 and greater than or equal to a threshold value PX, which is greater than 0 Nm, and the other one of the first human driving force H1 and the second human driving force H2 is less than or equal to the fourth value P4, which is less than the third value P3, the electronic controller 72 proceeds to step S102.

In step S102, the electronic controller 72 shifts the control state to the second control state and then ends the process. In a case where the control state is the second control state, the electronic controller 72 maintains the second control state.

The electronic controller 72 can be configured to shift the control state to the second control state in a case where the parameter P related to the human driving force H is less than or equal to a fifth value P5 and an acceleration state of the human-powered vehicle 10 continues over a second period. For example, the fifth value P5 is less than the first value P1. In this modified example, for example, in a case where the rider is traveling a downhill without rotating the pedals 34, the driving of the transmission body 20 with the motor 24 is restricted. Thus, unnecessary acceleration and unnecessary shifting actions are avoided.

Figure 16:
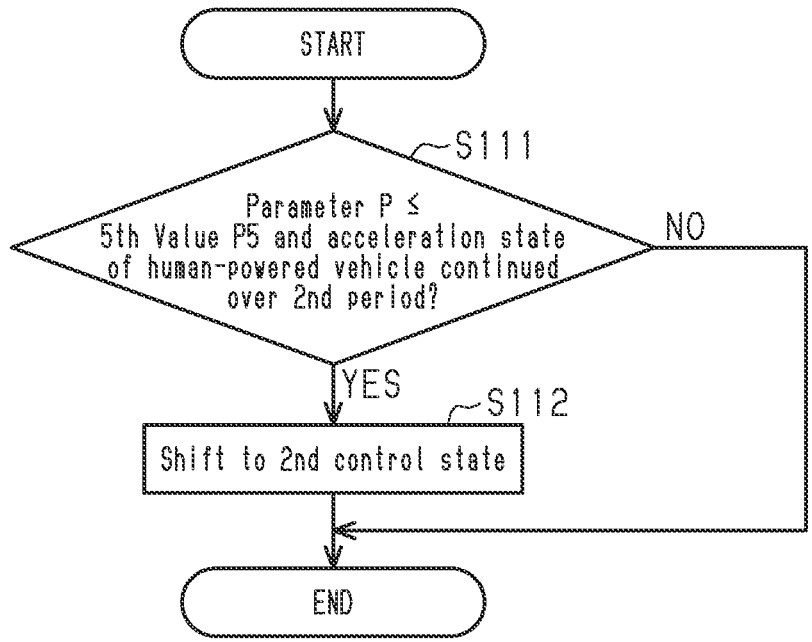
FIG. 16 is a flowchart of a process for changing the control state executed by an electronic controller in accordance with a second modified example.

With reference to FIG. 16, a process for shifting the control state of the motor 24 by the electronic controller 72 will now be described. For example, in a case where electric power is supplied to the electronic controller 72, the electronic controller 72 starts the process and proceeds to step S111 of the flowchart shown in FIG. 16. In a case where the flowchart shown in FIG. 16 ends, the electronic controller 72 repeats the process from step S111 after a predetermined interval, for example, until the supply of electric power stops.

In step S111, the electronic controller 72 determines whether the parameter P is less than or equal to the fifth value P5 and the acceleration state of the human-powered vehicle 10 continues over the second period. In a case where the parameter P is not less than or equal to the fifth value P5, the electronic controller 72 ends the process. In a case where the human-powered vehicle 10 is not in the acceleration state, the electronic controller 72 ends the process. In a case where the parameter P is not less than or equal to the fifth value P5 and the acceleration state of the human-powered vehicle 10 does not continue over the second period or longer, the electronic controller 72 ends the process. In a case where the parameter P is less than or equal to the fifth value P5 and the acceleration state of the human-powered vehicle 10 continues over the second period or longer, the electronic controller 72 proceeds to step S112.

In step S112, the electronic controller 72 shifts the control state to the second control state and then ends the process. In a case where the control state is the second control state, the electronic controller 72 maintains the second control state.

Figure 17:
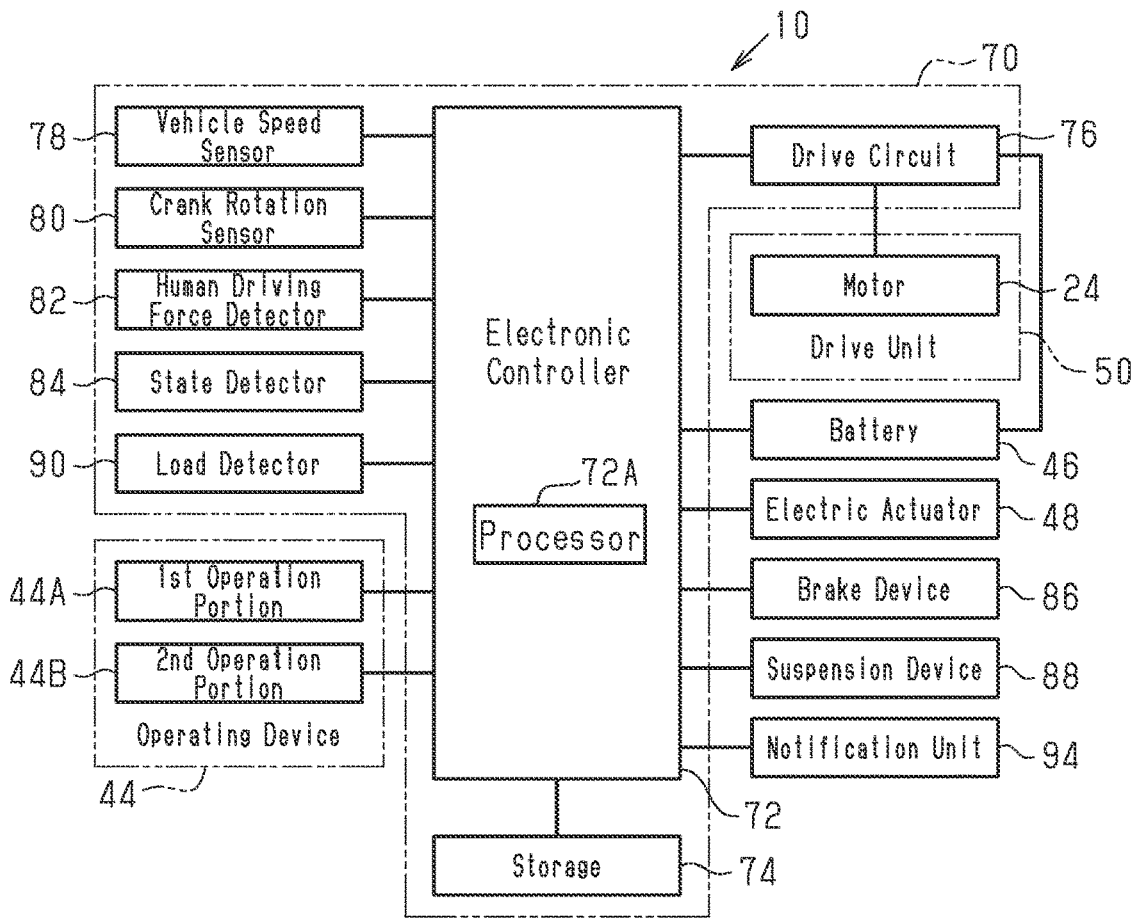
FIG. 17 is a block diagram showing the electrical configuration of a human-powered vehicle including a human-powered vehicle control device for a human-powered vehicle in accordance with a third modified example.
Figure 18:
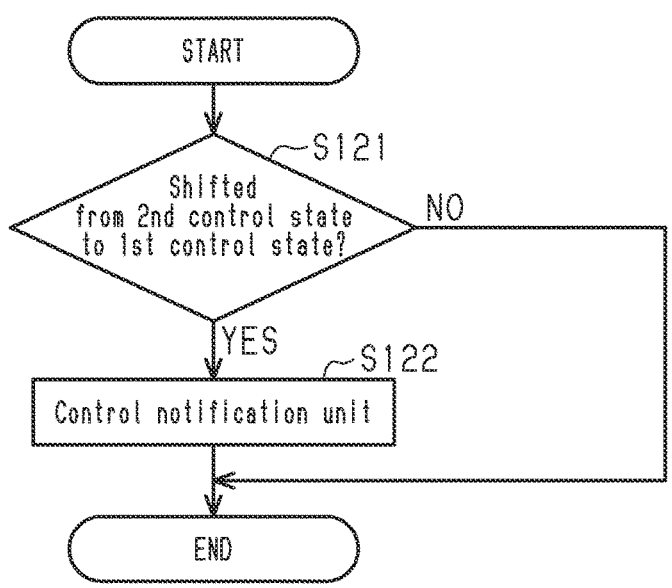
FIG. 18 is a flowchart of a process for controlling a notification unit executed by the electronic controller shown in FIG. 17.

In the first and second embodiments, as shown in FIG. 17, the human-powered vehicle 10 can further include a notification unit 94. The notification unit 94 can be configured to, for example, output a sound or show information on the display. The notification unit 94 can include a cycle computer. In a case where the human-powered vehicle 10 further includes the notification unit 94, the electronic controller 72 is configured to control the notification unit 94. Preferably, the electronic controller 72 controls the notification unit 94 and issue a notification with the notification unit 94 in a case where the electronic controller 72 shifts the control state from the second control state to the first control state. The process for controlling the notification unit 94 with the electronic controller 72 will now be described with reference to FIG. 18. For example, in a case where electric power is supplied to the electronic controller 72, the electronic controller 72 starts the process and proceeds to step S121 of the flowchart shown in FIG. 18. In a case where the flowchart shown in FIG. 18 ends, the electronic controller 72 repeats the process from step S121 after a predetermined interval, for example, until the supply of electric power stops.

In step S121, the electronic controller 72 determines whether to shift the control state from the second control state to the first control state. In a case where the electronic controller 72 does not shift the control state from the second control state to the first control state, the electronic controller 72 ends the process. In a case where the electronic controller 72 shifts the control state from the second control state to the first control state, the electronic controller 72 proceeds to step S122. In step S122, the electronic controller 72 controls the notification unit 94 and issues a notification with the notification unit 94 and then ends the process. In step S122, the electronic controller 72 notifies that the control state has shifted from the second control state to the first control state, for example, by outputting a sound or showing information on the display. For example, in the sixth embodiment, the notification unit 94 notifies the operator of the shifting to the first control state, that is, the completion of the second operation, to make sure that the operator performs the third operation.

Figure 19:
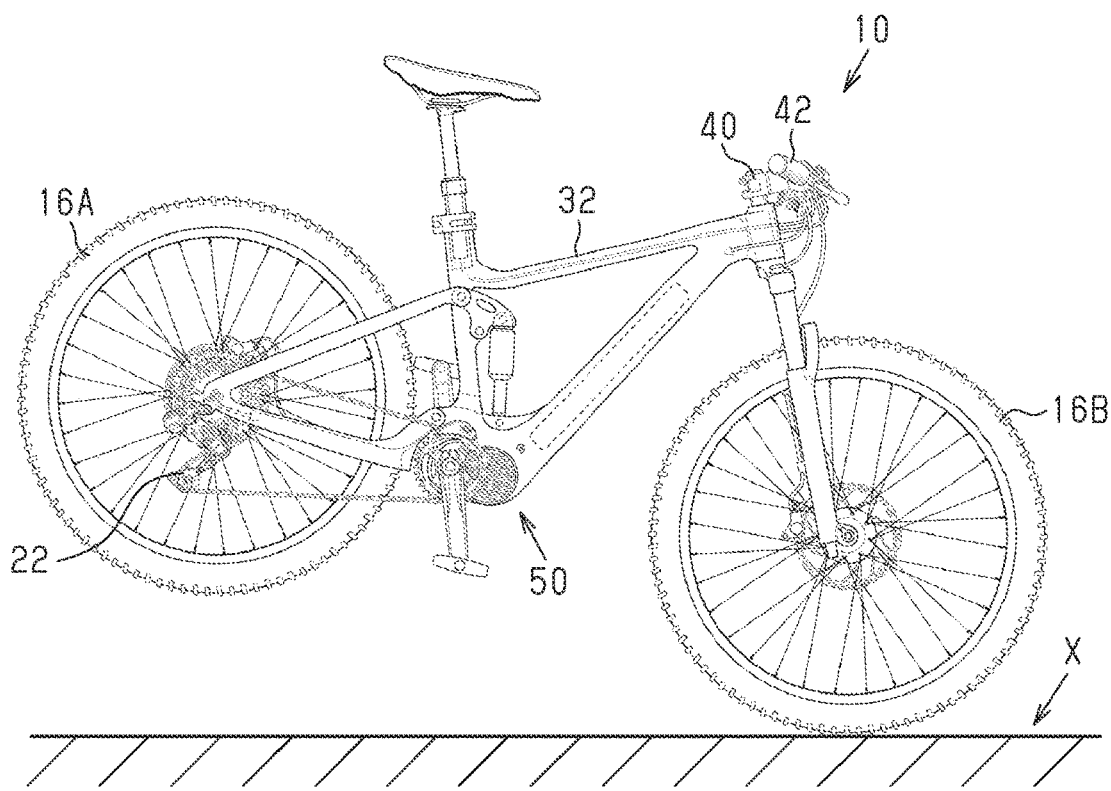
FIG. 19 is a side view of a human-powered vehicle in a state where the rear wheel is separated from ground.

In the first and second embodiments, the electronic controller 72 can be configured to perform the shifting action in a case where the wheel 16 is separated from ground X in the first control state. Preferably, the electronic controller 72 shifts the control state to the first control state regardless of operation by the operator in a case where separation of the wheel 16 from the ground X is detected. Preferably, the electronic controller 72 performs the shifting action in a case where only the drive wheel is separated from the ground X. The drive wheel is, for example, the rear wheel 16A. As shown in FIG. 19, for example, the electronic controller 72 performs the shifting action in a case where only the rear wheel 16A is separated from the ground X. More specifically, the case where only the rear wheel 16A is separated from the ground X includes a state in which only the rear wheel 16A is separated from the ground X and the front wheel 16B is in contact with the ground X. The drive wheel can be the front wheel 16B. For example, in a case where the rider lifts the rear wheel 16A with one hand to separate the rear wheel 16A from the ground X, the electronic controller 72 shifts the control state to the first control state. In this case, the shifting action can be performed by the rider operating the operating device 44 with the other hand. Alternatively, the shifting action can be performed regardless of operation by the rider.

In a case where the electronic controller 72 is configured to perform a shifting action in a case where the wheel 16 is separated from the ground X in the first control state, the state detector 84 includes a load sensor configured to detect separation of the wheel 16 from the ground X. Preferably, the load sensor is provided on each of the rear wheel 16A and the front wheel 16B. In a case where the absolute value of a difference in detection value of load between the rear wheel 16A and the front wheel 16B is greater than or equal to a predetermined difference, the electronic controller 72 determines that the wheel 16 is separated from the ground X. The electronic controller 72 can be configured to determine whether the drive wheel is separated from the ground X based on, for example, load on the motor 24.

Figure 20:
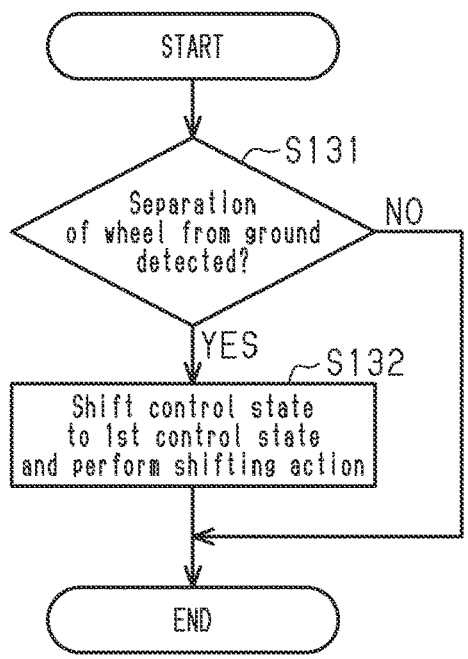
FIG. 20 is a flowchart of a process for changing the control state executed by an electronic controller in accordance with a fourth modified example.

A process for changing the control state with the electronic controller 72 will now be described with reference to FIG. 20. For example, in a case where electric power is supplied to the electronic controller 72, the electronic controller 72 starts the process and proceeds to step S131 of the flowchart shown in FIG. 20. In a case where the flowchart shown in FIG. 20 ends, the electronic controller 72 repeats the process from step S131 after a predetermined interval, for example, until the supply of electric power stops.

For example, in step S131, the electronic controller 72 determines whether separation of the wheel 16 from the ground X is detected. In a case where separation of the wheel 16 from the ground X is detected, the electronic controller 72 proceeds to step S132. In a case where separation of the wheel 16 from the ground X is not detected, the electronic controller 72 ends the process. In step S132, the electronic controller 72 shifts the control state to the first control state to perform the shifting action and then ends the process.

In the first and second embodiments, the electronic controller 72 can be configured to enable the operator to select the first control state by operating the operating device 66 in a state in which the human-powered vehicle 10 is at a standstill or the operator is dismounted from the human-powered vehicle 10. For example, the electronic controller 72 can be configured not to enable the operator to select the first control state even by operating the operating device 66 in a state in which the human-powered vehicle 10 is at a standstill. For example, the electronic controller 72 can be configured not to enable the operator to select the first control state even by operating the operating device 66 in a state in which the operator is dismounted from the human-powered vehicle 10. The electronic controller 72 can be configured to shift the control state to the first control state in a case where the first control state is selected. Alternatively, the electronic controller 72 can be configured to shift the control state to the first control state in a case where the first control state is selected and a condition for shifting the control state to the first control state is satisfied.

Figure 21:
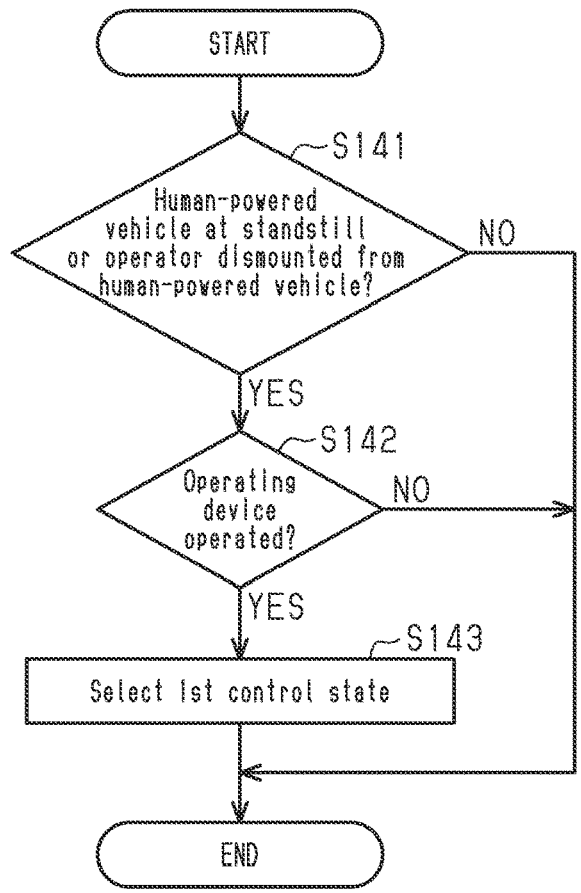
FIG. 21 is a flowchart of a process for changing the control state executed by an electronic controller in accordance with a fifth modified example.

A process for selecting the first control state with the electronic controller 72 will now be described with reference to FIG. 21. For example, in a case where electric power is supplied to the electronic controller 72, the electronic controller 72 starts the process and proceeds to step S141 of the flowchart shown in FIG. 21. In a case where the flowchart shown in FIG. 21 ends, the electronic controller 72 repeats the process from step S141 after a predetermined interval, for example, until the supply of electric power stops.

For example, in step S141, the electronic controller 72 determines whether the human-powered vehicle 10 is at a standstill or the operator is dismounted from the human-powered vehicle 10. In a case where the human-powered vehicle 10 is at a standstill or the operator is dismounted from the human-powered vehicle 10, the electronic controller 72 proceeds to step S142. In a case where the human-powered vehicle 10 is not at a standstill or the operator is riding the human-powered vehicle 10, the electronic controller ends the process.

In step S142, the electronic controller 72 determines whether the operating device 66 is operated. In a case where the operating device 66 is operated, the electronic controller 72 proceeds to step S143. In a case where the operating device 66 is not operated, the electronic controller 72 ends the process. In step S143, the electronic controller 72 selects the first control state and then ends the process.

In the first and second embodiments, the electronic controller 72 can be configured to shift the control state to the second control state in a case where the first control state continues for a fifth time or longer. For example, the fifth time is set in advance. For example, the fifth time is set to four seconds or longer and six seconds or shorter.

Figure 22:
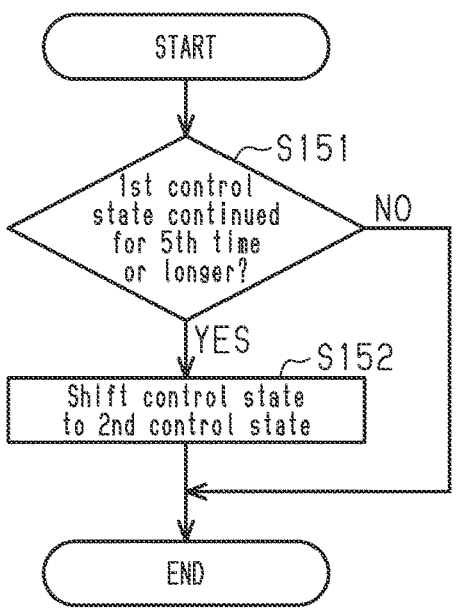
FIG. 22 is a flowchart of a process for changing the control state executed by an electronic controller in accordance with a sixth modified example.

A process for shifting the control state to the second control state with the electronic controller 72 will now be described with reference to FIG. 22. For example, in a case where electric power is supplied to the electronic controller 72, the electronic controller 72 starts the process and proceeds to step S151 of the flowchart shown in FIG. 22. In a case where the flowchart shown in FIG. 22 ends, the electronic controller 72 repeats the process from step S151 after a predetermined interval, for example, until the supply of electric power stops.

In step S151, the electronic controller 72 determines whether the first control state continues for the fifth time or longer. In a case where the first control state continues for the fifth time or longer, the electronic controller 72 proceeds to step S152. In a case where the first control state does not continue for the fifth time or longer, the electronic controller 72 ends the process.

In step S152, the electronic controller 72 shifts the control state to the second control state and then ends the process.

In the first and second embodiments, the electronic controller 72 can be configured to shift the control state to the second control state in a case where a load that is greater than or equal to a second load is applied to the motor 24 in the first control state. The case in which a load that is greater than or equal to the second load is applied to the motor 24 includes, for example, a case where an object is present between the transmission body 20 and the first rotational body 14 and applies load to the motor 24. The case where a load that is greater than or equal to the second load is applied to the motor 24 includes, for example, a case where a load caused by the wheel 16 that is held in the air and contacts ground is applied to the motor 24.

Figure 23:
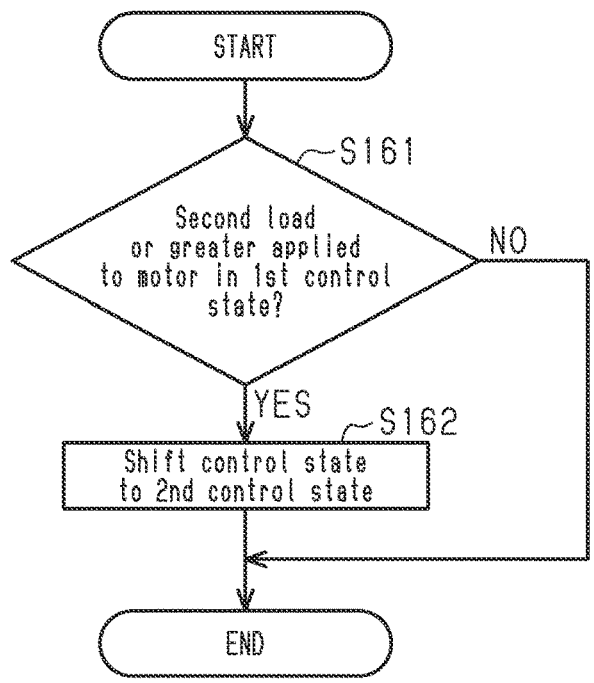
FIG. 23 is a flowchart of a process for changing the control state executed by an electronic controller in accordance with a seventh modified example.

A process for shifting the control state to the second control state with the electronic controller 72 will now be described with reference to FIG. 23. For example, in a case where electric power is supplied to the electronic controller 72, the electronic controller 72 starts the process and proceeds to step S161 of the flowchart shown in FIG. 23. In a case where the flowchart shown in FIG. 23 ends, the electronic controller 72 repeats the process from step S161 after a predetermined interval, for example, until the supply of electric power stops. For example, in step S161, the electronic controller 72 determines whether a load that is greater than or equal to the second load is applied to the motor 24. In a case where a load that is greater than or equal to the second load is applied to the motor 24, the electronic controller 72 proceeds to step S162. In a case where a load that is greater than or equal to the second load is applied to the motor 24, the electronic controller 72 ends the process. In step S162, the electronic controller 72 shifts the control state to the second control state and then ends the process.

In the first and second embodiments, the electronic controller 72 can be configured to shift the control state to the second control state in a case where the human-powered vehicle 10 starts traveling in the first control state. The case where the human-powered vehicle 10 starts traveling includes at least one of a case where the human torque HT that is input to the pedals 34 is greater than or equal to a predetermined torque, a case where the rotational speed C of the crank axle 12 is greater than or equal to a predetermined rotational speed, and a case where the roll angle of the human-powered vehicle 10 is greater than or equal to a predetermined roll angle.

Figure 24:
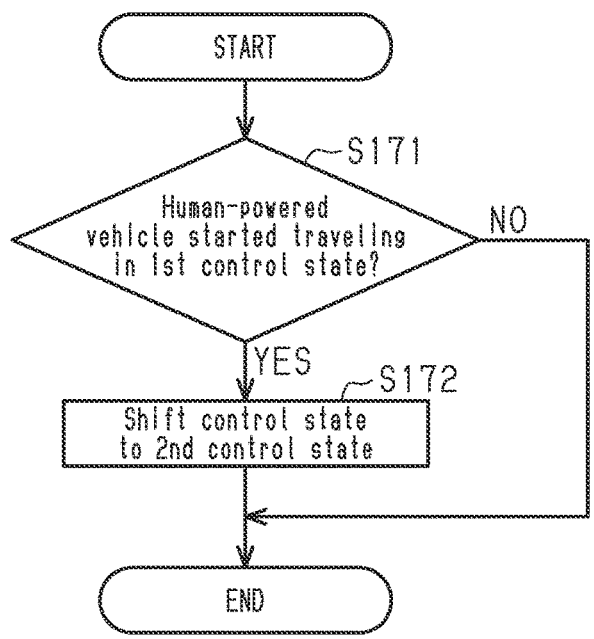
FIG. 24 is a flowchart of a process for changing the control state executed by an electronic controller accordance with in an eighth modified example.

A process for shifting the control state to the second control state with the electronic controller 72 will now be described with reference to FIG. 24. For example, in a case where electric power is supplied to the electronic controller 72, the electronic controller 72 starts the process and proceeds to step S171 of the flowchart shown in FIG. 24. In a case where the flowchart shown in FIG. 24 ends, the electronic controller 72 repeats the process from step S171 after a predetermined interval, for example, until the supply of electric power stops. For example, in step S171, the electronic controller 72 determines whether the human-powered vehicle 10 starts traveling in the first control state. In a case where the human-powered vehicle 10 starts traveling in the first control state, the electronic controller 72 proceeds to step S172. In a case where the human-powered vehicle 10 does not start traveling in the first control state, the electronic controller 72 ends the process. In step S172, the electronic controller 72 shifts the control state to the second control state and then ends the process.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A human-powered vehicle control device for a human-powered vehicle including a crank axle to which a human driving force is input, a first rotational body connected to the crank axle, a wheel, a second rotational body connected to the wheel, a transmission body engaged with the first rotational body and the second rotational body and configured to transmit a driving force between the first rotational body and the second rotational body, a derailleur configured to operate the transmission body to change a transmission ratio of a rotational speed of the wheel to a rotational speed of the crank axle, and a motor configured to drive the transmission body, the human-powered vehicle control device comprising:
    an electronic controller configured to control the motor,
    the electronic controller being configured to drive the transmission body with the motor and operate the transmission body with the derailleur to perform a shifting action that changes the transmission ratio in a case where the crank axle is stopped,
    the electronic controller being configured to be actuated in a control state including a first control state in which the shifting action is performed and a second control state in which a driving force of the motor during the shifting action is reduced compared to the first control state,
    the electronic controller being configured to shift the control state to the second control state in a case where a rider is riding the human-powered vehicle and the human-powered vehicle is temporarily stopped, and
    the electronic controller being configured to shift the control state from the second control state to the first control state in a case where a predetermined condition is satisfied.

2. The human-powered vehicle control device according to claim 1, wherein
the predetermined condition is satisfied in a case where a parameter related to the human driving force is greater than or equal to a first value.

3. The human-powered vehicle control device according to claim 2, wherein
the first value is greater than or equal to 20Nm.

4. The human-powered vehicle control device according to claim 3, wherein
the first value is greater than or equal to 30 Nm.

5. The human-powered vehicle control device according to claim 2, wherein
the parameter related to the human driving force includes the human driving force and an assist force of the motor.

6. The human-powered vehicle control device according to claim 2, wherein
the human-powered vehicle further includes a first pedal and a second pedal that are coupled to the crank axle,
the parameter related to a human driving force includes a first human driving force received from the first pedal and a second human driving force received from the second pedal, and
the electronic controller is configured to shift the control state to the second control state in a case where one of the first human driving force and the second human driving force is less than or equal to a third value and the other one of the first human driving force and the second human driving force is less than or equal to a fourth value that is less than the third value.

7. The human-powered vehicle control device according to claim 1, wherein
the electronic controller is configured to shift the control state to the second control state in a case where a parameter related to the human driving force is less than or equal to a fifth value and an acceleration state of the human-powered vehicle continues over a second period.

8. The human-powered vehicle control device according to claim 1, wherein
in a case where the first control state continues for a fifth time or longer, the electronic controller is configured to shift the control state to the second control state.

9. The human-powered vehicle control device according to claim 1, wherein
in a case where a load that is greater than or equal to a second load is applied to the motor in the first control state, the electronic controller is configured to shift the control state to the second control state.

10. The human-powered vehicle control device according to claim 1, wherein
in a case where the human-powered vehicle starts traveling in the first control state, the electronic controller is configured to shift the control state to the second control state.

11. The human-powered vehicle control device according to claim 1, wherein
the human-powered vehicle further includes a notification unit,
the electronic controller is configured to control the notification unit, and
the electronic controller is configured to control the notification unit and issue a notification with the notification unit in a case where the electronic controller shifts the control state from the second control state to the first control state.

12. The human-powered vehicle control device according to claim 1, wherein
in a case where the crank axle is at a standstill in the first control state, the electronic controller is configured to shift the control state to the second control state.

13. The human-powered vehicle control device according to claim 1, wherein
the electronic controller is configured to control the motor to disable the shifting action in the second control state.

* * * * *